United States Patent [19]
Rasmussen et al.

[11] 3,987,667
[45] Oct. 26, 1976

[54] SELF-CONTAINED INSTRUMENT FOR MEASURING SUBTERRANEAN TUNNEL WALL DEFLECTION

[75] Inventors: Donald Edgar Rasmussen, Kennewick; Peter John Hof, Jr., Richland, both of Wash.

[73] Assignee: The United States of America as represented by the Secretary of the Interior, Washington, D.C.

[22] Filed: June 9, 1975

[21] Appl. No.: 585,223

[52] U.S. Cl. .................................. 73/88 E; 346/79
[51] Int. Cl.² .......................................... G01B 7/16
[58] Field of Search ...................... 73/88 E, 88 F; 116/DIG. 34; 346/79

[56] References Cited
UNITED STATES PATENTS

| | | | |
|---|---|---|---|
| 1,708,333 | 4/1929 | Smith | 73/88 E |
| 3,416,230 | 12/1968 | Oleson et al. | 73/88 E |
| 3,427,632 | 2/1969 | Vahs et al. | 346/79 |
| 3,826,128 | 7/1974 | McVey et al. | 73/88 E |

*Primary Examiner*—James J. Gill
*Assistant Examiner*—Anthony V. Ciarlante
*Attorney, Agent, or Firm*—Gersten Sadowsky; Donald R. Fraser

[57] ABSTRACT

The deflection of a subterranean tunnel is measured with a rod-like, self-contained instrument that is adapted to be inserted into a radially extending bore of the tunnel adjacent an end of the tunnel where the tunnel is being dug. One end of the instrument is anchored at the end of the bore remote from the tunnel wall, while the other end of the instrument is anchored adjacent the end of the wall in proximity to the tunnel wall. The two ends of the instrument are linearly displaceable relative to each other; the displacement is measured by a transducer means mounted on the instrument. Included in the instrument is a data storage means including a paper tape recorder periodically responsive to a parallel binary signal indicative of the measured displacement. In response to an operator command, a visual indicator including a pair of different colored light emitting diodes, at a face of the rod adjacent the tunnel wall, is responsive to a serial binary signal indicative of the measured displacement. The operator commands the unit by momentarily shining a light on a photodetector at the face of the tube adjacent the tunnel wall. The relative position of the two ends of the instrument is adjustable so that both of the light emitting diodes are substantially simultaneously activated while the instrument is in a calibrate mode; the device is activated into the calibration mode by illuminating the photodetector for a longer time interval than that utilized to provide a visual reading of the transducer measurement.

36 Claims, 22 Drawing Figures

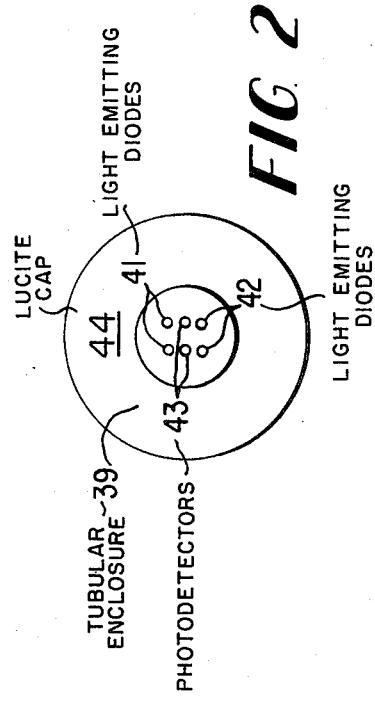
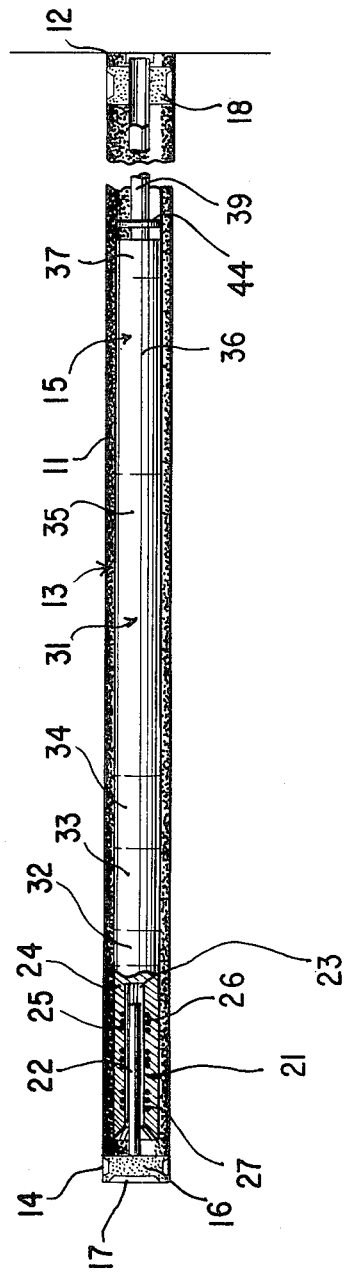

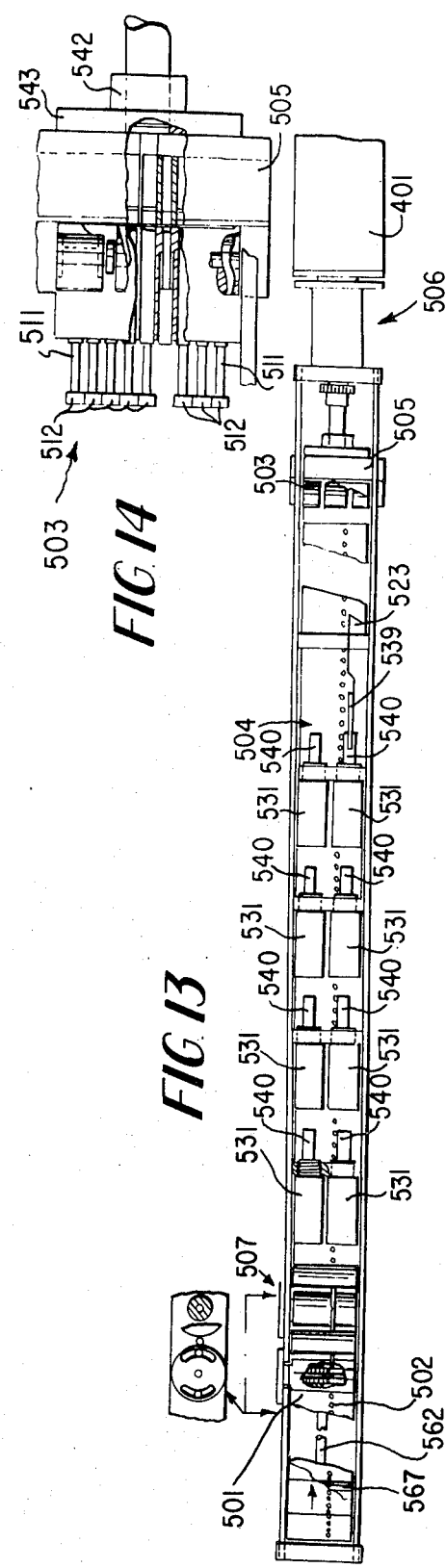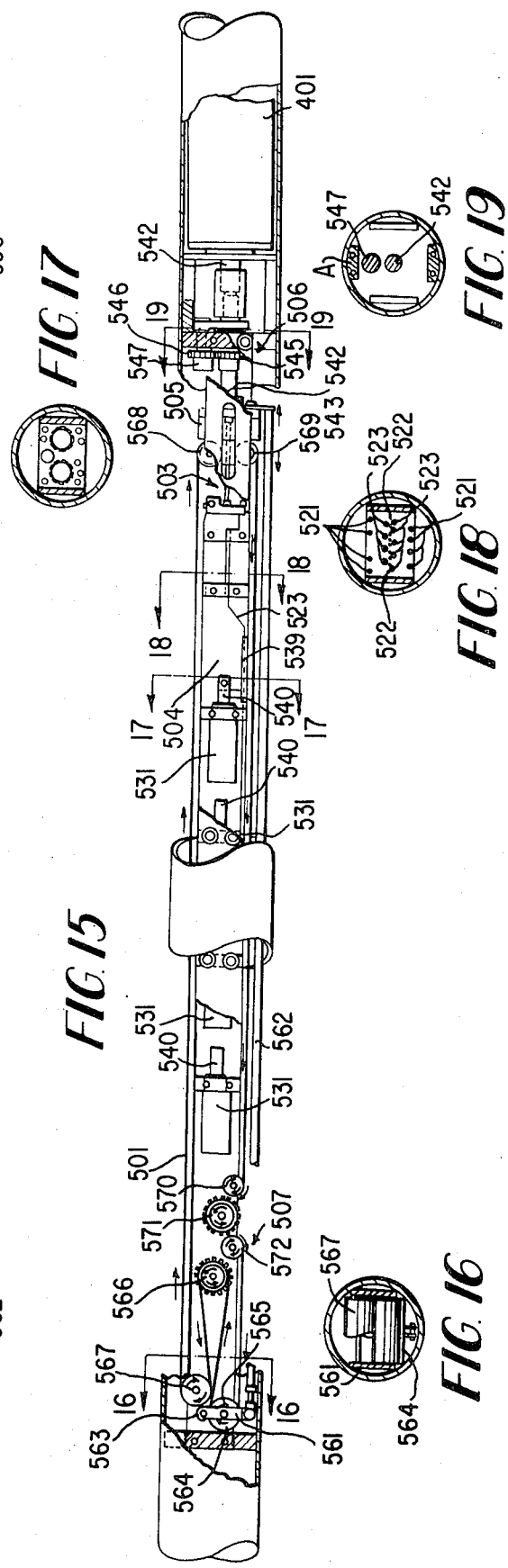

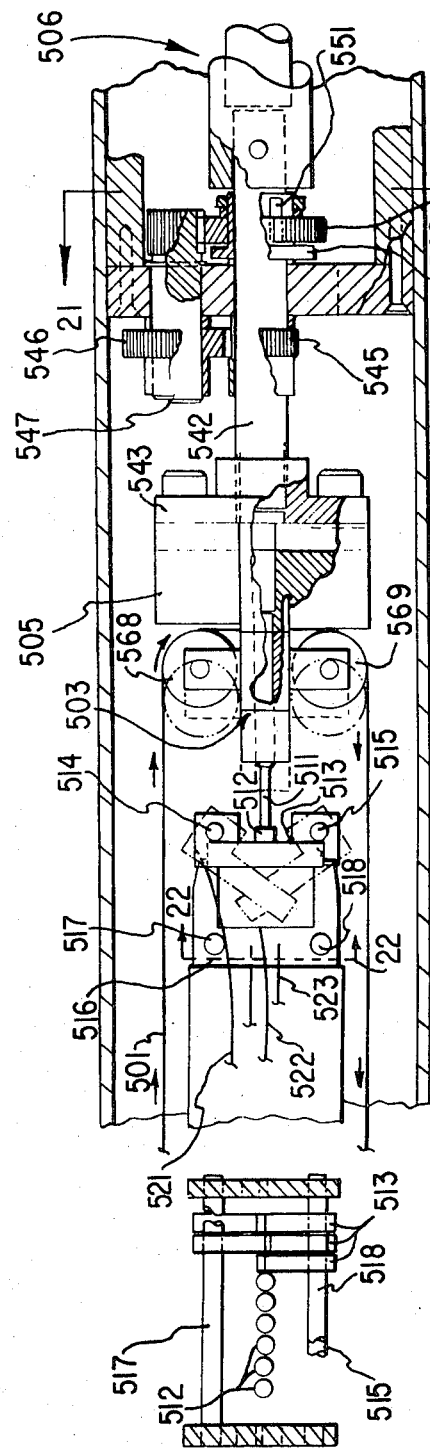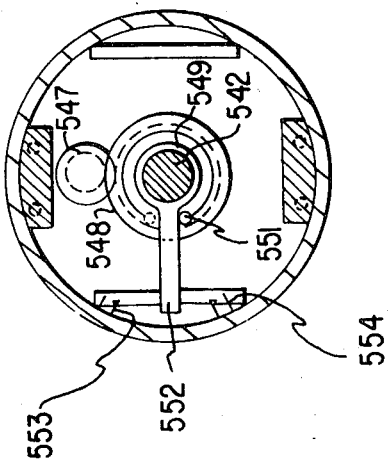

SELF-CONTAINED INSTRUMENT FOR MEASURING SUBTERRANEAN TUNNEL WALL DEFLECTION

FIELD OF INVENTION

The present invention relates generally to apparatus for measuring the amount of deflection of a subterranean tunnel, and more particularly to a completely self-contained rod-like instrument including a deflection measuring transducer, a data storage means, and a visual indicator to an operator.

BACKGROUND OF THE INVENTION

In the underground excavation industry, there are presently instruments to measure the deformation of tunnel walls in order rationally to establish underground support requirements as a tunnel is being dug, for a mine, for example. By measuring rock deflection at the tunnel wall, it is possible to predict tunnel support requirements as tunnel digging progresses. To be most beneficial, it is necessary to measure the rock deflection that occurs as the supporting tunnel rock is being removed. Such a requirement implies measuring the tunnel rock deflection at a location very close to the digging space of the tunnel.

It is known that rock deflection can be measured by forming a radial bore in the tunnel and inserting a rod-like measuring instrument into the bore. One end of the instrument is anchored to the end of the bore remote from the tunnel wall, while the other end of the instrument is anchored to the end of the bore adjacent the tunnel wall. The two ends of the instrument are movable relative to each other, whereby deflection of the rock is determined by measuring the relative displacement between the two ends of the instrument.

The prior art instruments have generally required connections to external signal storage devices, such as recorders, as well as to power supplies for transducers mounted on the instrument for measuring the relative movement of the two ends of the rod-like instrument. However, such external connections cannot usually be properly established and maintained, without greatly impeding the progress of the tunnel as it is being dug. Hence, the typical prior art instruments have not beenn compatible with measuring rock deflection as the tunnel is being dug, and thereby have not been effectively utilized in predicting tunnel support requirements as tunnel digging progresses.

It is, accordingly, an object of the present invention to provide a new and improved instrument for measuring the amount of deflection of a subterranean tunnel while the tunnel is being dug.

Another object of the invention is to provide a new and improved, completely self-contained instrument for measuring the amount of deflection of a subterranean tunnel while the tunnel is being dug.

A further object of the invention is to provide a self-contained instrument for measuring the amount of deflection of a subterranean tunnel while the tunnel is being dug, wherein data derived from the instrument are stored in the instrument for subsequent use.

A further object of the invention is to provide a new and improved, self-contained highly sensitive instrument for measuring the amount of deflection of a subterranean tunnel, which instrument is easily inserted into and removed from a bore drilled radially in the tunnel.

An additional object of the invention is to provide a new and improved, self-contained and reuseable instrument for measuring the amount of deflection of a subterranean tunnel while the tunnel is being dug.

Yet another object of the invention is to provide a new and improved signal storage apparatus, in the form of a paper tape recorder, that can be contained on an instrument used to measure the amount of deflection of a subterranean tunnel, and which instrument is adapted to be inserted into a relatively small diameter bore extending radially from the tunnel wall.

BRIEF DESCRIPTION OF THE INVENTION

In accordance with the present invention, the deflection of a subterranean tunnel is measured while the tunnel is being dug with a rod-like instrument that is adapted to be inserted into a radially extending bore of the tunnel wall, wherein the instrument includes a transducer for measuring the amount of linear displacement between a pair of relatively displaceable ends of the rod-like instrument, a signal storage means, and a visual readout means located on a face of the instrument adjacent the tunnel wall. The complete instrument is self-contained, even though the diameter thereof is on the order of 1½ inches, enabling it to be inserted into a bore of the tunnel generally having a diameter on the order of two inches. The instrument is susceptible to operation over a relatively long time interval, on the order of several days, because it normally consumes a relatively low amount of power; a substantial amount of power is consumed only when the signal storage means is activated, at variable intervals that are usually spaced minutes apart. Prior to the instrument being initially activated there is a very low power consumption, even though the instrument can be turned on after being inserted in the bore, without touching any mechanical switches.

Operator commands are supplied to the instrument by illuminating a photodetector mounted on a face of the instrument adjacent the tunnel wall. Such illumination is conveniently provided by a flashlight or a lantern carried on a helmet of an operator working in the tunnel. In response to the photodetector being illuminated for different periods, different modes of operation are provided. In particular, the device is initially activated by illuminating the photodetector for a period on the order of 30 seconds. Thereafter, by illuminating the photodetectors for 15 additional seconds, the instrument is activated so that the storage means is periodically activated and the transducer can be calibrated. During calibration the two relatively displaceable ends are linearly displaced relative to each other until a visual indication of a zero position is attained. The visual indication is provided by a pair of different colored light sources that are preferably light emitting diodes. During calibration, the two different colored light sources are steadily activated, depending upon the position of the transducer relative to a reference position; when the transducer is on one side of the reference position, the light source for one color (e.g., green) is activated, while the light source of the other color (e.g., red) is activated when the transducer is on the other side of the reference position. In response to the transducer being adjusted or calibrated so that it is at the reference position, both light sources appear to be activated substantially simultaneously.

After calibration has been completed, and it is desirable to provide a visual indication of the position of the transducer, the photodetector is illuminated for a relatively short interval. In response to the short interval illumination of the photodetector, a serial binary signal indicative of the transducer position is supplied to the two different colored light sources. In response to a binary signal of one level, one of the light sources is flashed on; in response to the second binary level, the other light source is flashed on. Thereby, the operator is able to manually record the binary magnitude of the transducer position.

Once the system has been installed, readings of the transducer position are automatically and periodically supplied to a signal storage device. In a preferred embodiment of the invention, the signal storage device is a specially designed punch paper tape recorder that can fit into the approximately 1½ inch inside diameter tube. The recorder is responsive to a parallel binary signal indicative of the transducer position. The recorder is of a relatively low speed type, since it is periodically activated typically only once every fifteen minutes to punch one line of information. The recorder includes a number of pins responsive to a parallel binary signal indicative of the transducer position. In response to the magnitude of the binary signal, certain of the pins are selectively locked into position, while other pins are easily moved. After the selected pins have been locked into position adjacent one side of the tape, a die plate is translated into engagement with the other side of the tape. The die plate and tape are advanced at the same rate so that they appear stationary relative to each other. Moving the die plate to cause the paper to be punched after the pins have been selectively locked, allows a drive motor for the die plate to be placed at one end of the recorder, whole pin selecting solenoids are placed at the other end of the recorder. This arrangement also enables the recorder to have a size such that it can be fit into the small diameter tube.

It is, accordingly, still another object of the invention to provide a new and improved low speed punch paper tape recorder.

A further object of the invention is to provide a punch paper tape recorder particularly adapted to be inserted into a tube forming a housing for a self-contained instrument for measuring the deflection of a subterranean tunnel.

An additional object of the invention is to provide a new and improved punch paper tape recorder particularly adapted to be located in a tube having an inner diameter on the order of 1½ inches.

Still a further object of the invention is to provide new and improved apparatus for enabling an instrument for measuring the amount of deflection of a subterranean tunnel to be calibrated.

Yet another object of the invention is to provide a new and improved visual indicator for an instrument utilized to measure the amount of deflection of a subterranean tunnel.

A further object of the invention is to provide an instrument for measuring the amount of deflection of a subterranean tunnel wherein the same digitally responsive indicators utilized for indicating the amount of deflection are employed for calibrating the instrument.

A further object of the invention is to provide an instrument for measuring the amount of deflection of a subterranean tunnel wherein commands are supplied to the instrument by an operator without the operator touching the instrument.

An additional object of the invention is to provide an apparatus for measuring the amount of deflection of a subterranean tunnel wherein commands to control readout of measurements are coupled to the apparatus by supplying optical energy to the instrument.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 1 is a side view of the general arrangement of a preferred embodiment of the present invention;

FIG. 2 is an end view of the face of the instrument adapted to be located in proximity to the tunnel wall;

FIGS. 6–12, together, are circuit diagrams of the circuitry functionally illustrated by FIG. 4, wherein FIG. 6 is a schematic diagram of external command and quiescent power circuitry, FIG. 7 is a circuit diagram of a clock, power reset source and auto start source, FIG. 8 is a circuit diagram of timing logic for the remainder of the circuitry, FIG. 9 is a schematic diagram of power control circuitry for the remainder of the circuitry, FIG. 10 is a schematic diagram of an analog to digital converter, FIG. 11 is a schematic diagram of circuitry to provide a visual indication of the position of the transducer, and FIG. 12 is a circuit diagram of drive circuitry for the punch of the paper tape recorder;

FIG. 13 is a plan view of the paper tape recorder;

FIG. 14 is an enlarged view of a portion of the paper tape recorder illustrated in FIG. 13;

FIG. 15 is a side view of the paper tape recorder;

FIG. 16 is a side view, taken through the lines 16—16 of FIG. 15, specifically illustrating idler roller mechanism for driving the paper tape;

FIG. 17 is a cross-sectional view, taken through the lines 17—17 of FIG. 15, specifically illustrating the position of a pair of solenoids;

FIG. 18 is a side-sectional view, taken through the lines 18—18 of FIG. 15, specifically illustrating the positions of pull wires and springs for controlling punches of the paper tape recorder;

FIG. 19 is a cross-sectional view, taken through the lines 19—19 of FIG. 15, specifically illustrating the position of drive shafts for a die plate of the punch paper tape recorder;

FIG. 20 is an enlarged view of the drive and tape punching area of the paper tape recorder;

FIG. 21 is a sectional view, taken through the lines 21—21 of FIG. 20, specifically illustrating a motor drive shaft and a tongue for controlling the extent of rotation of the motor; and FIG. 22 is a sectional view, taken through the lines 22—22 of FIG. 20, specifically illustrating punch pins of the recorder and a portion of the control mechanism for the pins.

DETAILED DESCRIPTION OF THE DRAWING

Figure 3:
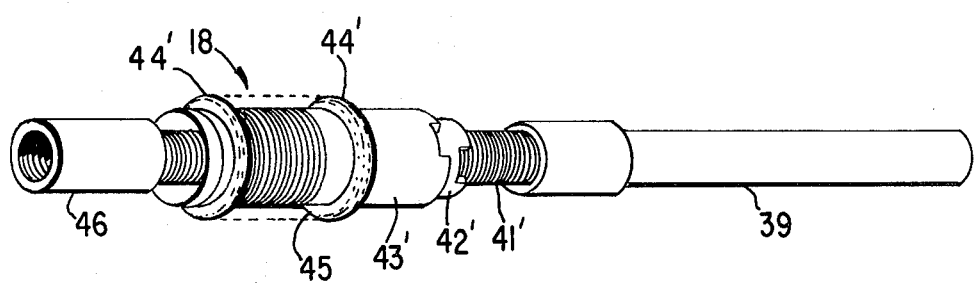
FIG. 3 is an exploded view of an anchor assembly at the end of the instrument adjacent the tunnel wall.

Reference is now made to FIG. 1 of the drawing wherein there is illustrated an elongated bore 11, typically having a length of between 7 and 25 feet, in wall 12 of a subterranean tunnel, such as subsists in a mine. Bore 11 extends radially of the tunnel, i.e., at right angles to the longitudinal axis of the tunnel, and typically has a diameter on the order of 2 inches. Fitted within bore 11 is a self-contained instrument 13 for measuring the deflection of wall 12 relative to rock at the face 17 of bore 11 remote from wall 12. Instrument 13 has a rod-like shape and is formed of two parts 14 and 15 which are longitudinally translatable relative to each other. Part 14 is secured to remote face 17 by a conventional anchor 16 that bears longitudinally and radially against face 17 and the wall of bore 11. Part 15 is secured in bore 11 adjacent tunnel wall 12 by anchor 18 that bears radially against the wall of bore 11 at a position close to the intersection of the bore and tunnel wall.

To measure the deflection of wall 12 relative to face 17, linear variable differential transformer (LVDT) 21 is provided. Core 22 is normally attached to anchor 16 using extension rods (not shown) of length suitable to place the tunnel end of part 15 near tunnel end anchor 18. Transformer 21 includes a fixed, cylindrical core 22 of high magnetic permeability that is fixedly mounted on a face of anchor 16 so that it extends longitudinally in bore 11 toward tunnel wall 12. Core 22 extends longitudinally of an elongated bore 23 in non-magnetic tube 24 at the end of part 15 remote from wall 12. Mounted on the inner wall of tube 24 are coils 25, 26 and 27 that respectively form excitation and differential output windings of LVDT 21. In response to the relative position of core 22 and tube 24 due to deflection of wall 12 relative to end face 17, there is a change in magnetic flux between excitation coil 25 and differential output coils 26 and 27. The flux change is reflected in a variation of the voltage between windings 26 and 27 in proportion to the relative longitudinal position of the two anchored ends of instrument 13.

Tube 24 forms the end of a cylindrical instrument housing 31 to which it is fixedly connected; the tube and housing have the same outer diameter, approximately 1⅝". Typically, housing 31 has a total length, from the end of tube 24 to its other end, which is proximate the tunnel end of bore 11, of five and one-half feet. Within cylindrical housing 31 are cylindrical compartments 32–37, spaced from tube 24 in the order named. In compartment 32 there are located electronic circuits that excite winding 25 and are responsive to the output signal of differential windings 26 and 27. In compartments 34 and 36 are located batteries; compartment 35, between the two battery compartments, contains a signal storage means, in the form of a punch paper tape recorder responsive to parallel binary signals. In compartment 33, circuitry is provided for controlling electronic circuity included in compartment 32, as well as for controlling activation of the recorder included in compartment 35.

End compartment 37 is responsive to signals derived from the electronic equipment included in compartment 33, as well as to externally induced operator command signals. The electronic circuitry included in compartment 37 includes a visual indicator which is optically coupled to the face of instrument 13 proximate tunnel wall 12 via extension tube 39. The externally induced command signals are coupled to a photodetector network included in compartment 37 in response to an optical signal supplied by an operator being coupled from the face of the instrument proximate tunnel wall 12 to the photodetector via tube 39.

Tube 39 fixedly connects together the face of the instrument proximate tunnel wall 12 and the end wall of housing 31 where compartment 37 is located. Annular anchor 18 includes a cylindrical inner wall which is secured to an outer cylindrical wall of extension tube 39 just behind the intersection of bore 11 and tunnel wall 12. The optical energy for energizing the photodetectors may be derived from a flashlight held by an operator in the tunnel or in response to light from a lantern mounted on a helmet of the operator. Two green light emitting diodes (LED's) 41 and two red (LED's) 42, as well as two photodetectors 43, are provided for redundancy, in the event of a failure to any one of these elements. It is to be understood, however, that only a single LED 41, a single LED 42 and a single photodetector 43 need be provided, if the reliability of these elements is considered to be sufficiently high. Light is transmitted to photodetectors 43 and from light emitting diodes 41 and 42 via a lucite cap 44 which forms a face of instrument 13 that can be viewed from the tunnel.

After parts 14 and 15 of instrument 13 have been anchored in situ, and prior to the initiation of normal operation of the instrument, the instrument is calibrated by translating core 22 relative to windings 25–27 until windings 26 and 27 derive an output which causes a predetermined reading to be derived from the LVDT 21. To adjust the relative positions of parts 14 and 15, the longitudinal position of externally threaded tube 41' relative to tunnel wall 12 is adjusted by the apparatus illustrated in FIG. 3. Hollow tube 41' engages instrument zeroing nut 42' that is rotatable but not translatable within tubular extension 43' of anchor 18. (Although extension 43' is fixed to anchor 18, the extension can be unscrewed from the anchor thereby allowing all of part 15 to be removed for repair or battery replacement without disturbing anchor 18). Extension 43' is fixedly mounted on cylinder 45 that includes a pair of longitudinally spaced external ribs 44' between which adhesive is extruded utilizing relatively conventional anchoring procedures. Threaded shaft 41' extends through nut 42', extension 43' and cylinder 45, whereby nut 42' can be rotated in shaft 41' and within anchor extension 43' causing longitudinal displacement of tube 41' and windings 25–27 of transformer 21 after anchor 18 has been fixed in situ. Fixedly mounted on the end of shaft 41', at the end of the instrument closest to tunnel wall 12, is hollow cylindrical housing extension 39. The other ennd of tube 41' is connected to part 15 using coupling 46. Lucite cap 44 is mounted at the end of the instrument adjacent photodetectors 43 and LED's 41 and 42 and isolates the interior of instrument 13 from the underground environment.

Prior to installation, the instrument is in a standby, extremely low power consuming state such that the amount of current drawn from the batteries is approximately the same as leakage current while the batteries are on the shelf. When the instrument is initially installed in bore 11, photodetectors 43 are illuminated for approximately 30 seconds, causing the instrument to go from the standby state to a quiescent state, whereby it consumes a greater amount of power and is adapted to be responsive to additional signals coupled by the operator to photodetector 43. Generally, after the instrument has been activated to the quiescent state the first command supplied by the operator is a command to switch to a calibrate mode or state. This is accomplished by the operator illuminating photodetectors 43 for a period between one and three seconds; actually, the circuitry will switch into the calibrate mode in response to illumination of photodetectors 43 for a period between one and twenty-five seconds, but the operator is advised that he is to illuminate the photodetectors for between one and three seconds.

With the instrument in the calibrate mode, green LED's 41 and red LED's 42 provide an indication of the relative position of core 22 and windings 25–27, about a reference point. In response to windings 25–27 being inserted into bore 11 beyond the reference point, green LED's 41 are activated, while red LED's 42 are activated in response to windings 25–27 not being beyond the reference position. The position of threaded shaft 41' relative to nut 42' is adjusted until both red and green LED's 41 and 42 are substantially simultaneously activated, at which time LVDT 21 is at the reference position. After a predetermined time interval, on the order of 1½ minutes, the instrument is automatically activated out of the calibrate mode. If the instrument has not been calibrated during the 1½ minute interval, it is again activated into the calibrate mode by illuminating photodetector 43 for a second period of between 1 and 3 seconds.

After the instrument has been calibrated, it returns to the quiescent state. Thereafter, in response to an additional 25 second illumination of photodetector 43, the instrument is periodically automatically activated so that the relative position of parts 14 and 15 is coupled from transformer 21 as a parallel, binary signal to the punch paper tape recorder included in compartment 31. The frequency of the recorder in compartment 31 being activated is pre-selectable, and is typically on the order of once every 1,000, 2,000 or 4,000 seconds. Immediately prior to the recorder in compartment 31 being activated, the system is activated into a full power state, where it usually remains until the signal value derived from transducer 21 has been punched into the paper tape recorder. Thereafter, the system usually returns to the quiescent state, so that the batteries in compartments 34 and 36 are not exhausted until many recorder activation sequences have occurred.

The operator is also able to obtain a visual indication, in binary form, of the relative position of instrument parts 14 and 15. In particular, the operator is provided with a binary signal indicative of the exact position of core 22 relative to windings 25–27 by activating photodetector 43 for a relatively short interval, less than 7/10 of a second. In response to such an instantaneous illumination of photodetector 43, the instrument usually goes into a full power state and a serial binary signal is derived in response to the output of LVDT 21 and is coupled to green and red LED's 41 and 42. A binary one level causes green LED's 41 to be activated, while a binary zero level causes red LED's 42 to be activated. Thereby, the operator is supplied with a series of flashing red and green lights, with the most significant bit being supplied to one of LED's 41 or 42 first, and the least significant bit being supplied to one of LED's last. After the least significant bit has activated LED's 41 or 42, the instrument usually returns to the quiescent state.

Certain safeties are provided in the event that the recorder included in compartment 31 is activated while photodetectors 43 are momentarily illuminated; normally momentary illumination of photodetectors 43 causes a visual indication of the position of core 22 relative to windings 25–27 to be derived. However, if the recorder in compartment 31 is activated prior to momentary illumination of photodetector 43, the recorder remains activated and no signal is supplied to LED's 41 and 42. The operator must again illuminate photodetectors 43 to enable LED's 41 and 42 to be activated upon completion of a record cycle. In response to photodetectors 43 being momentarily illuminated immediately prior to activation of the recorder in compartment 31, whereby the recorder would normally be activated while the LED's are activated, the instrument remains in a powered condition after activation of LED's 41 and 42. Thereby the recorder is automatically activated immediately after the least significant bit has been illuminated by one of LED's 41 or 42.

Figure 4:
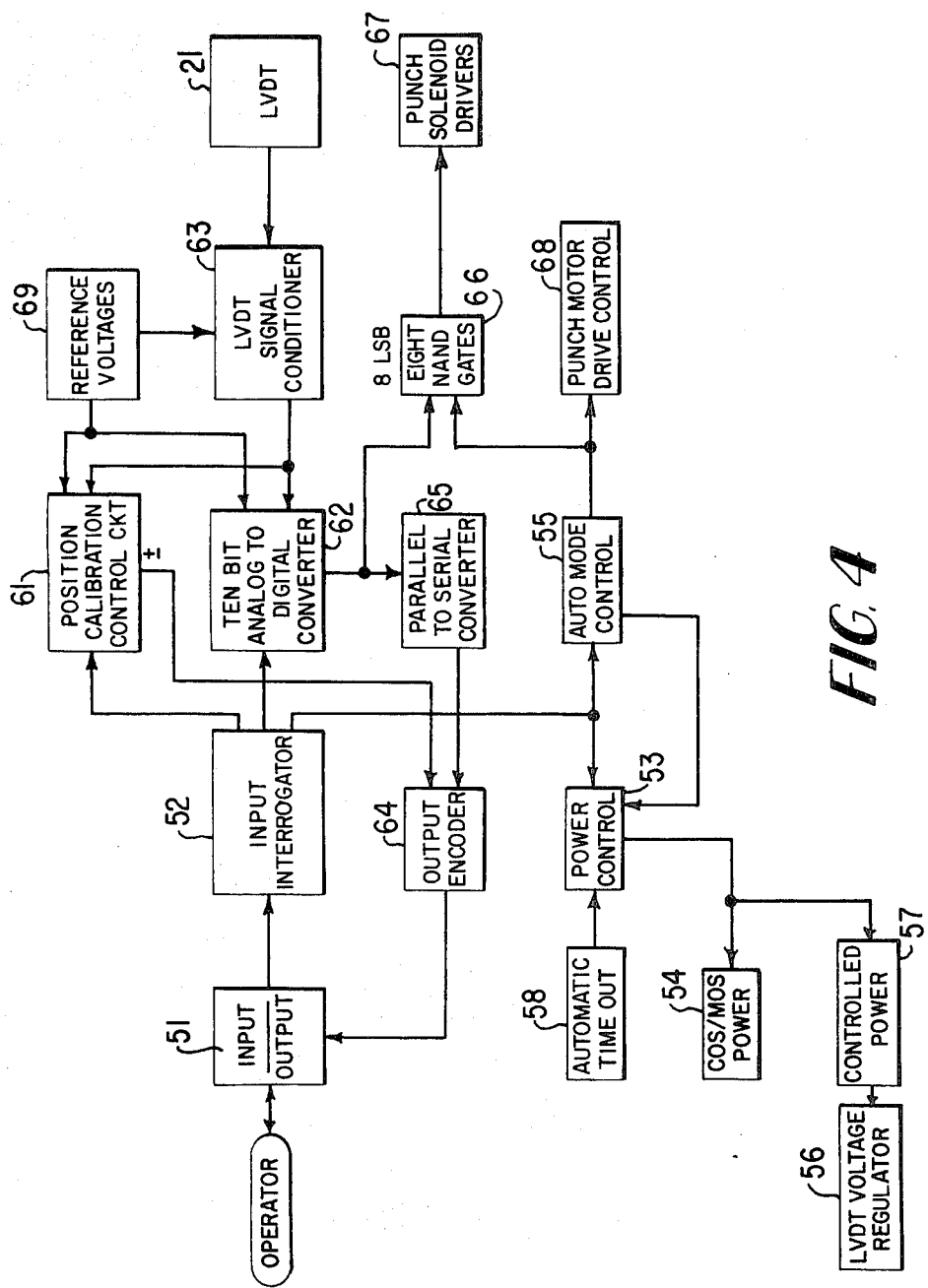
FIG. 4 is a functional block diagram of the electronic circuitry included in the instrument of FIG. 1.

A functional block diagram of the electronics network included in compartments 32, 33 and 37 is illustrated in FIG. 4. The apparatus illustrated schematically in FIG. 4 is responsive to the output signal of LVDT 21 and the optical signals impinging on photodetectors 43, to control periodic storing of data by the recorder in compartment 31 and the selective coupling of binary data bits to LED's 41 and 42. In addition, the circuitry schematically illustrated in FIG. 4 controls the coupling of power from the batteries in compartments 34 and 36 to the electronic networks and the recorder.

Communication between the operator and the equipment included in instrument 13 is provided by an input-/output interface 51 including LED's 41 and 42, and photodetectors 43, as previously described. In response to illumination of photodetectors 43 by the operator, input/output unit 51 supplies signals to input interrogator 52. Input interrogator performs three basic functions in response to the length of the signals supplied to it by photodetector 43.

Input interrogator 52 supplies a signal to power control circuit 53 to activate the electronic circuitry from a standby to a quiescent state, if the instrument is not already in a quiescent state. Power control unit 53 causes the instrument to be activated into a quiescent state in response to the first 30 second light duration signal detected by photodetectors 43 after installation of instrument 13 in bore 11. With power control circuit 53 activated to the quiescent mode, timing and control circuitry included in the remainder of the electronic network is continuously powered by unit 54. Since the timing and control circuitry includes low power consuming COS/MOS active elements, there is a relatively light drain on the batteries while the system is in the quiescent mode. With COS/MOS power unit 54 in an activated state in response to the output of power control network 53, subsequent input signals from the operator, as detected by photodetectors 43, can be interpreted and accepted. In addition, activation of COS/MOS power control unit 54 enables clock signals to be derived for providing periodic, automatic control of LVDT 21, the punch paper tape recorder, and other control circuits that couple the output of the LVDT to the recorder.

To these ends, power control circuit 53 is responsive to a periodically derived control signal from auto mode control network 55. Power control network 53 is also responsive to subsequent signals from input interrogator 52; the subsequent signals indicate that the operator is desirous of determining the reading of LVDT 21. In such an event, input interrogator 52 supplies a signal to power control unit 53, causing full power to be supplied to LVDT voltage regulator 56 via controlled power network 57. Controlled power network 57 also controls other circuitry necessary for coupling the output signal of LVDT 21 to LED's 41 and 42 to provide an indication of the relative position of core 22 and windings 25–27. Power control unit 53 is capable of retaining an established mode of operation for power failures of up to ½ second from its D.C. power supply. Controlled power unit 57 also controls the flow of current to a motor and punch solenoids included in the punch paper tape recorder in compartment 35.

To minimize the drain of the batteries when measuring functions are not required, and it is only necessary to activate timing circuits in the instrument, power control unit 53 is normally maintained in a cutoff condition by automatic time-out circuit 58. Automatic time-out circuit 58 deactivates power control unit 53, without effecting COS/MOS power supply 54 (once the COS/MOS power supply has been turned on), in three different ways. In particular, automatic time-out circuit 58 causes power control unit 53 to deactivate controlled power unit 57 in response to a binary signal indicative of the position of the LVDT being completely read out to the operator. Also, a signal is supplied by automatic time-out circuit 58 to activate power control unit 53 to turn off controlled power unit 57 in response to an indication being derived that a recording operation of the punch paper tape recorder has been completed. As a safety, automatic time-out unit supplies a deactivation signal to power control unit 53 for controlled power unit 57 approximately 100 seconds after power has been turned on by unit 57 for any reason. Thus, the instrument cannot remain in a high power state accidently after it has been calibrated, unless the operator overtly activates photodetectors 43 for a sufficient time interval to cause the instrument to again go into a calibrate mode.

The signal supplied by automatic time-out circuit 58 to power control unit 53 does not effect the power supplied by COS/MOS power unit 54 to the COS/MOS timing circuits, and related circuitry. To remove power to the COS/MOS circuits, the battery packs included in compartments 34 and 36 must be disconnected for at least 20 seconds.

Input interrogator 52, in addition to providing control signals for power control unit 53, derives enable commands for position calibration control circuit 61 and a 10-bit analog to digital converter 62. The length of the light beam detected by photodetectors 43 determines whether input interrogator 52 enables position calibration circuit 61 or the analog to digital converter 62; in response to a one to three second signal, calibration control circuit 61 is activated, while a less than 1 second signal causes activation of the analog to digital converter.

Position calibration control circuit and analog to digital converter 62 respond to the output signal of LVDT 21, as coupled through LVDT signal conditioner 63. LVDT signal conditioner 63 offsets the position indicating output signal of LVDT 21 by an internally adjustable reference voltage to provide a unipolar output signal to analog to digital converter 62. Signal conditioner 63 includes a differential amplifier including a pair of voltage followers and an operational amplifier having an overall gain of less than 1; in particular of 0.3. Signal conditioner 63 and analog to digital converter 62 are arranged so that a zero output signal of LVDT 21 provides a mid-scale binary output signal of converter 62.

Analog to digital converter 62, when enabled in response to the output signal of input interrogator 52, monitors a unipolar output signal of signal conditioner 63, and converts this unipolar analog signal to a 10-bit, parallel binary signal. Analog to digital converter 62 is of the dual slope type, whereby it is immune to long term changes in characteristics of electronic integrating circuitry included therein. Each change in the least significant bit digit of the binary one output of converter 62 represents 5 mils (0.005 inches) of movement of core 22 relative to windings 25–27.

Position calibration control circuit 61, when enabled in response to a command signal from input interrogator 52, compares the output signal of signal conditioner 63 with a predetermined reference value. The reference voltage of position calibration circuit 61 is adjustable so that it is equal to the voltage derived from LVDT signal conditioner 63 when core 22 is inserted 11/12 of the way into bore 23. For a typical LVDT calibrated in this way, the minimum output signal of conditioner 63 corresponds with one-quarter inch expansion of tunnel wall 12. The maximum output from signal conditioner 63 occurs in response to a 2 2¾ inch contraction of tunnel wall 12. If there is additional contraction of the tunnel wall, such contraction can be monitored by removing a section from tube 39, manually recording the length of the removed section and recalibrating the instrument. During the calibration mode, circuit 61 derives a binary output signal having a zero or one level indicative of the position of core 22 relative to the reference position, 11/12 of the way into bore 23. In response to core 22 being farther than 11/12 of the way into the bore, a binary zero level is derived at the output of control circuit 61, while a binary one level is derived in response to core 22 being less than 11/12 of the way into bore 23. In response to core 22 being positioned exactly at 11/12 of the way into bore 23, the output of calibration control circuit 61 fluctuates back and forth between the binary zero and one levels because of the inherent instability of high gain, noise responsive comparison circuitry included in calibration control circuit 61. Position calibration control circuit 61 remains activated for approximately 1½ minutes or 100 seconds, and is deactivated in response to automatic time-out circuit 58 supplying a control signal to power control unit 53, which in turn deactivates controlled power unit 57.

During the calibrate mode, the binary one and zero levels derived from position calibration control circuit 61 are supplied to green and red LED's 41 and 42, in input/output unit 51, through output encoder 64. Thereby, the red and green LED's are either steadily activated, or are substantially simultaneously activated, depending upon the relative position of core 22 and windings 25–27. As indicated supra, the position of anchored part 15 is adjusted relative to the position of anchored part 14 until LED's 41 and 42 are substantially simultaneously activated.

In response to photodetector 43 being illuminated for less than 0.7 of a second, input interrogator 52 supplies a control signal to analog to digital converter 62, whereby the ten-bit output signal of the converter is supplied to parallel to serial converter 65. Parallel to serial converter 65 derives a 10-bit binary signal train indicative of the position of core 22 relative to windings 25–27. The 10 binary bits, having values of one or zero, are supplied through output encoder 64 to LED's 41 and 42. Green LED's 41 are activated in response to each binary one level derived from converter 65, while red LED's 42 are activated in response to each binary zero signal derived from the converter. The activation time of LED's 41 and 42 is approximately 0.5 second, a sufficient interval to enable the operator ot manually record the binary values sequentially displayed to him by the LED's.

In response to periodic activation of auto mode control circuit 55, the punch paper tape recorder included in compartment 31 is activated. The signal recorded by the punch paper tape recorder is the eight least significant bits derived from analog to digital converter 62. Because the tunnel wall movement has a long time constant and is unidirectional, it is adequate to record only the eight least significant bits derived from converter 62.

It is to be recalled that converter 62 and the circuitry associated with the periodic recording of data are automatically, periodically activated by supplying a signal from auto mode control unit 55 to power control unit 53. The eight least significant bits of converter 62 are selectively coupled through eight parallel NAND gates included in circuit 66. The NAND gates included in circuit 66 are simultaneously activated in response to the periodic output of auto mode control unit 55. Circuit 66 thereby selectively derives eight parallel binary bits which are supplied to eight punch solenoid drivers 67 included in the punch paper tape recorder. After the drivers 67 are supplied with binary signals, auto mode circuit 55 supplies a command signal to punch motor drive controller 68 which activates a motor included in the punch paper tape recorder. Activation of the motor results in a die plate being urged against a side of the paper tape opposite from the side against which punches are urged by the solenoid driver 67. Those punches which are connected to solenoid drivers that are responsive to binary one signals are locked in place, thereby causing perforation of the punch paper tape with a binary signal indicative of the postion of core 22 relative to windings 25–27. After the holes have been punched into the paper tape, the die plate is retracted, and the activated solenoid drivers are deactivated. Simultaneously with forward movement of the die plate, the punch paper tape is advanced. As the die plate returns to its initial location, a signal is derived causing power control unit 53 to remove power from controlled power unit 57.

To supply the proper voltages to analog to digital converter 52, signal conditioner 63, and position calibration circuit 61, a source 69 of D.C. reference voltage is provided and is activated by controlled power unit 57.

Figure 5:
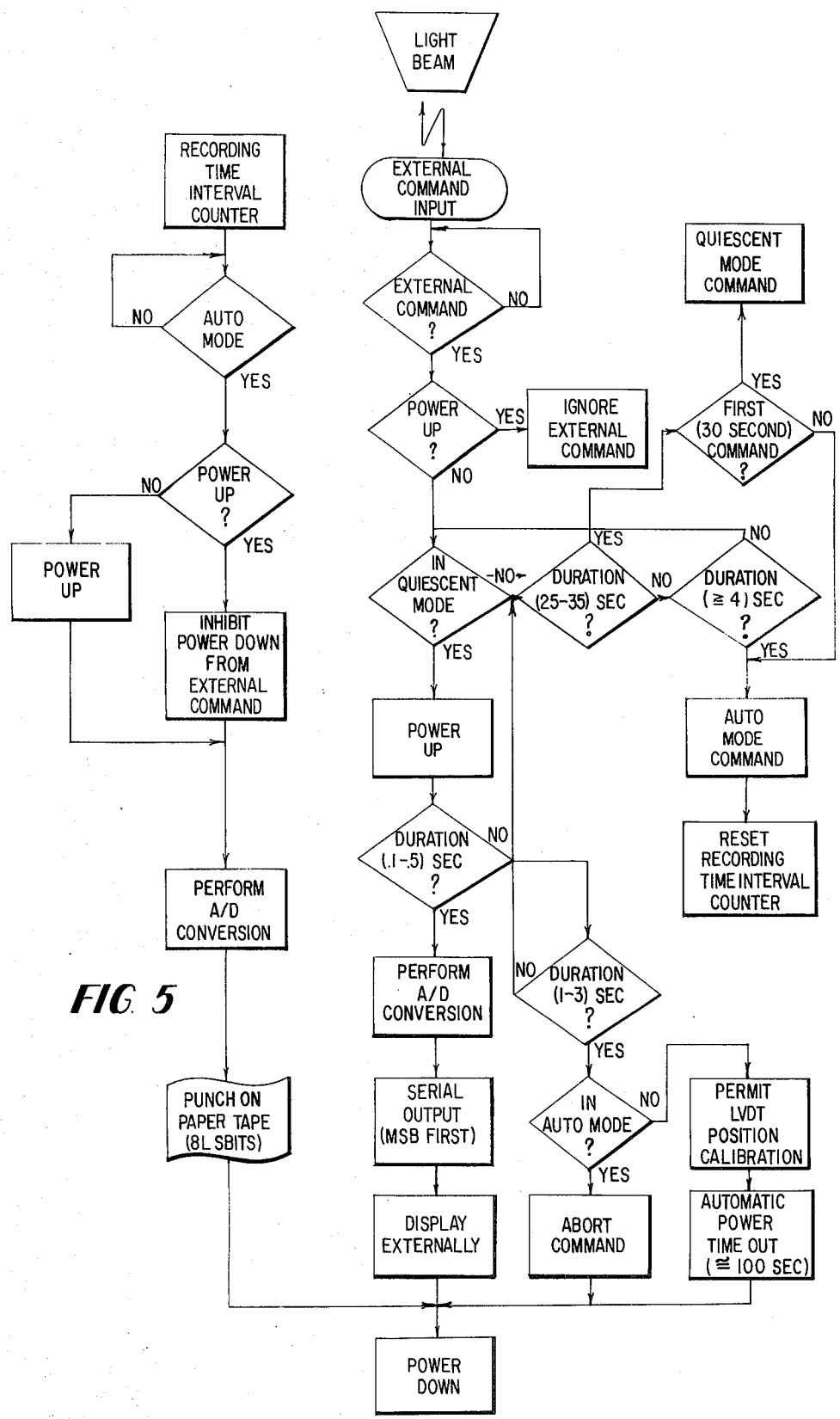
FIG. 5 is a flow diagram of the operations performed by the circuitry functionally illustrated in FIG. 4.
Figure 6:
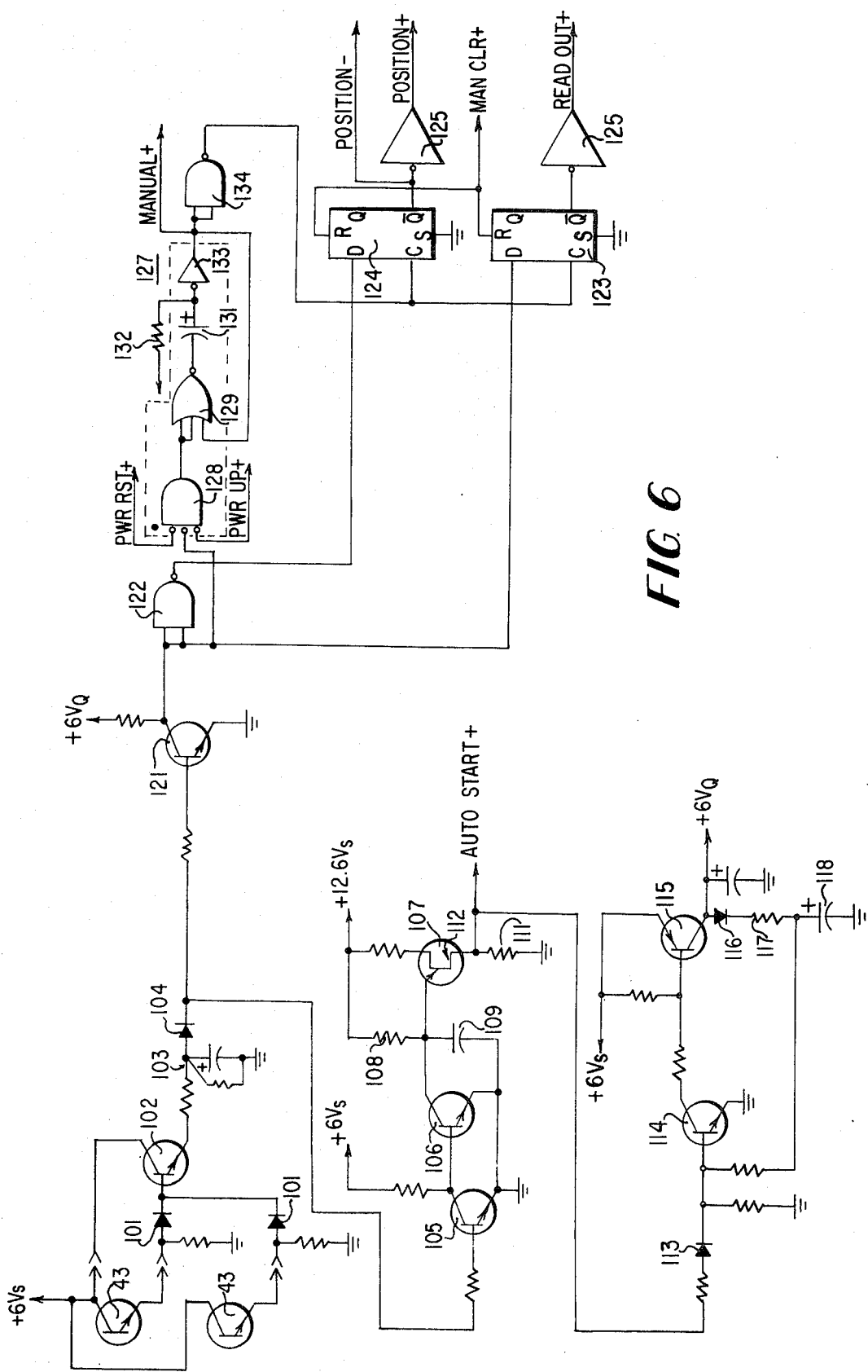
Figure 7:
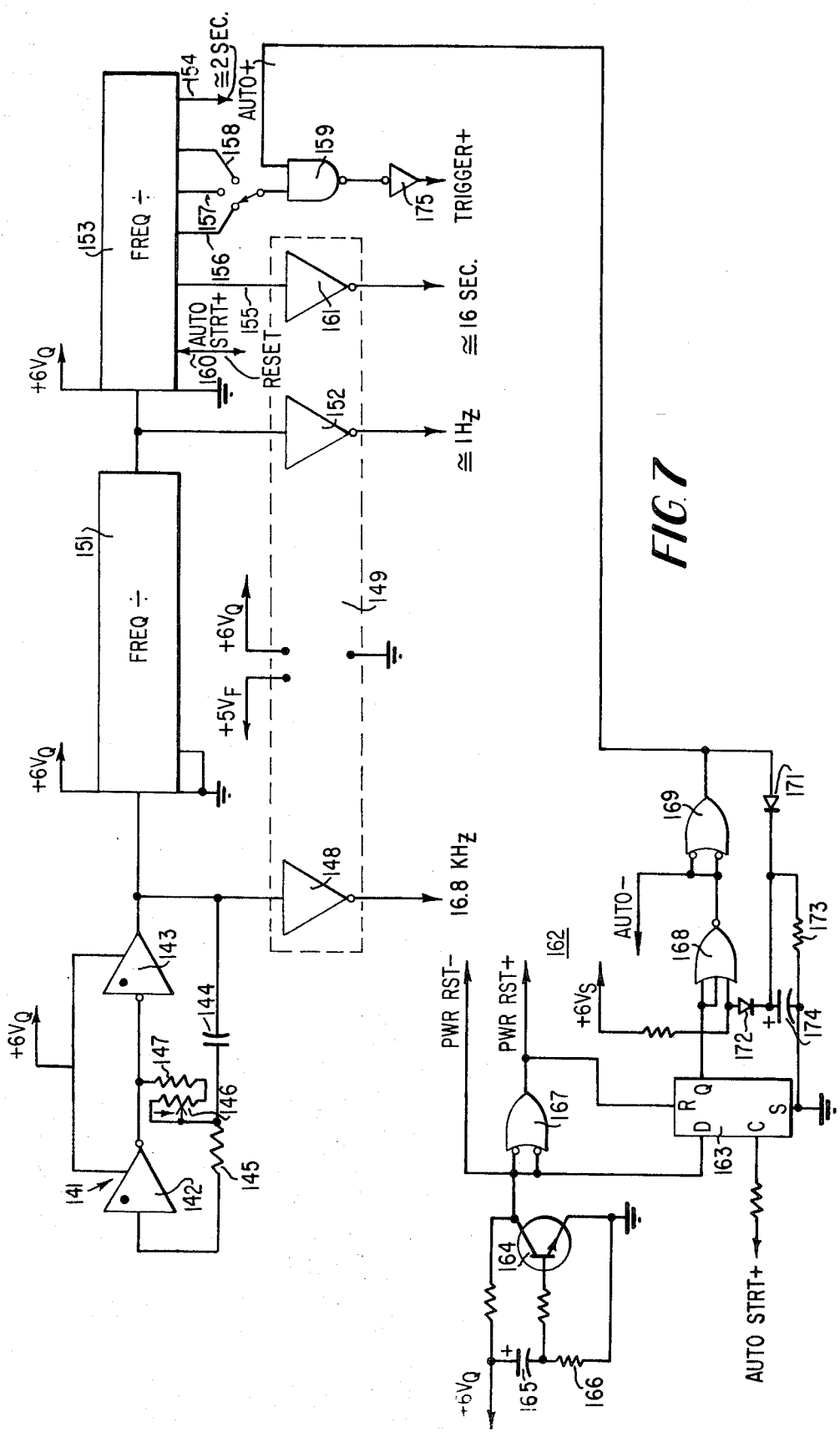
Figure 8:
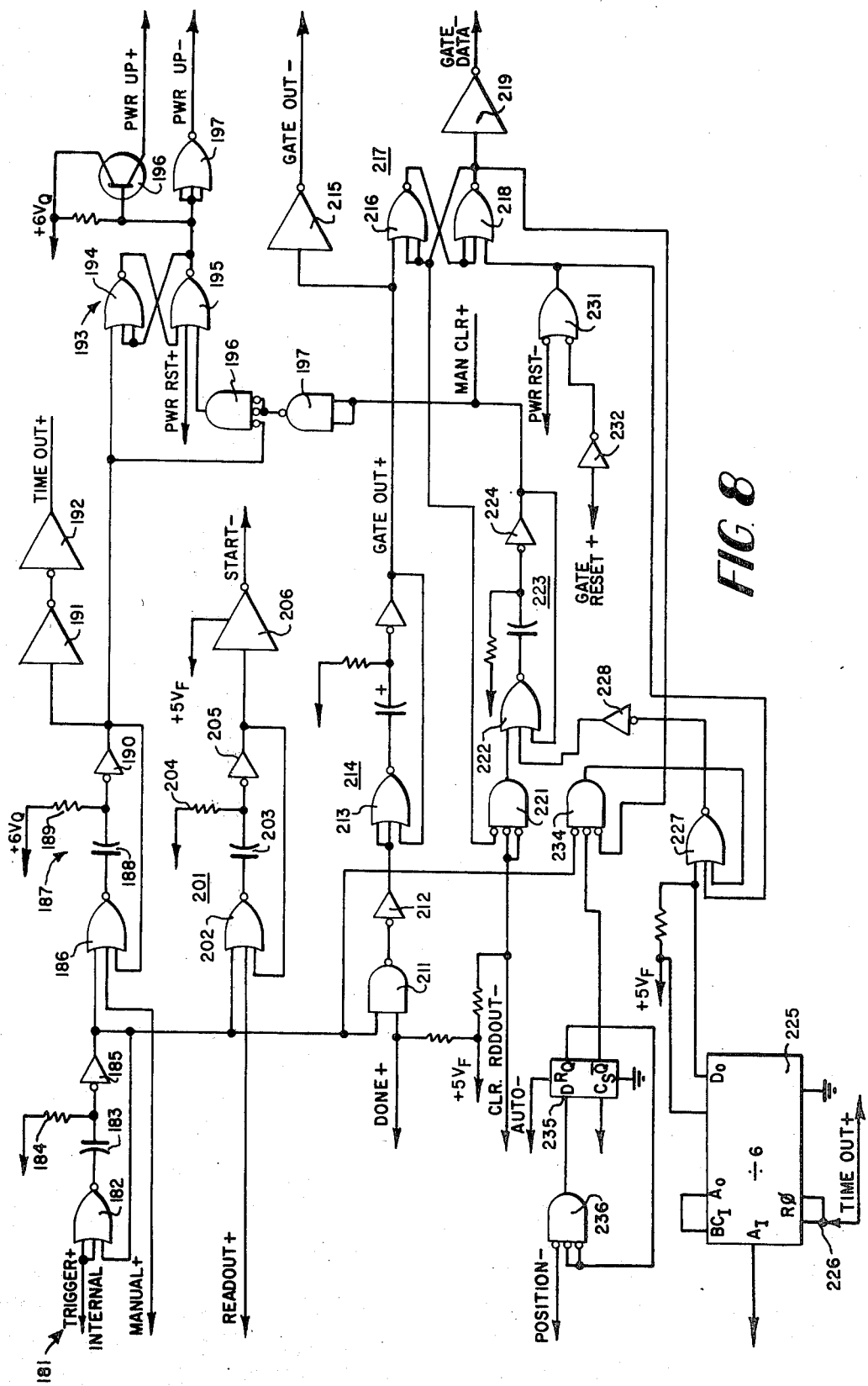
Figure 9:
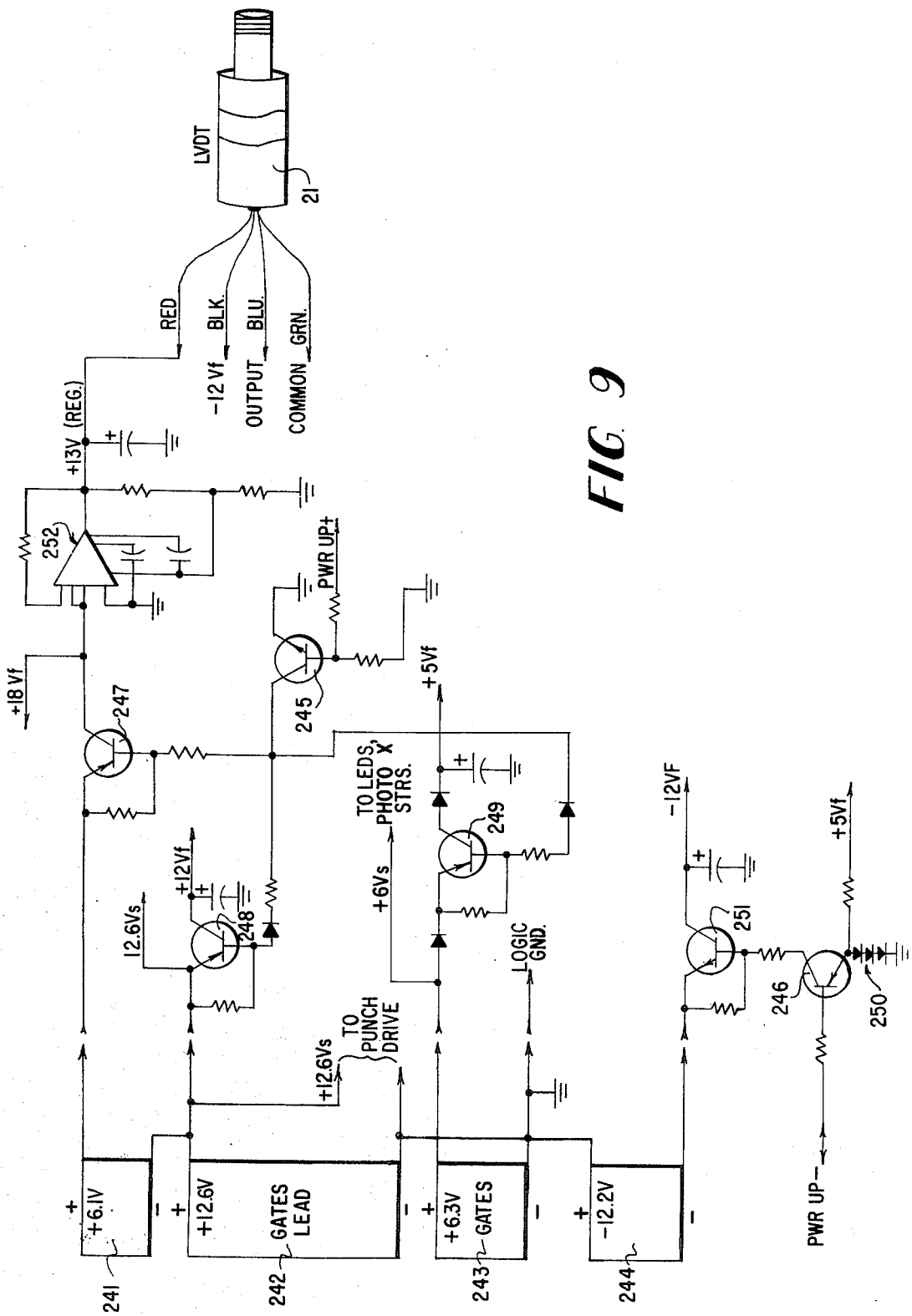
Figure 10:
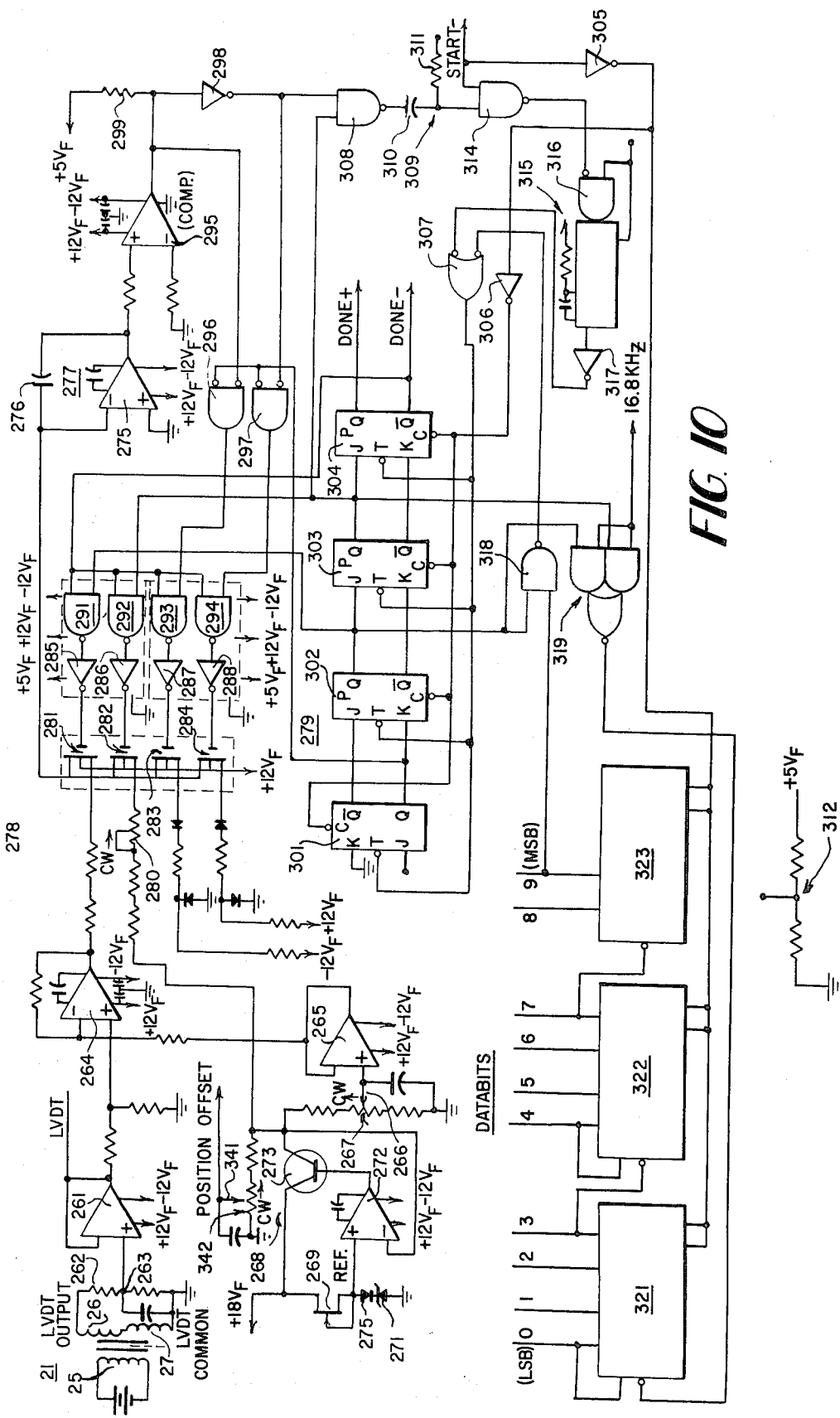
Figure 11:
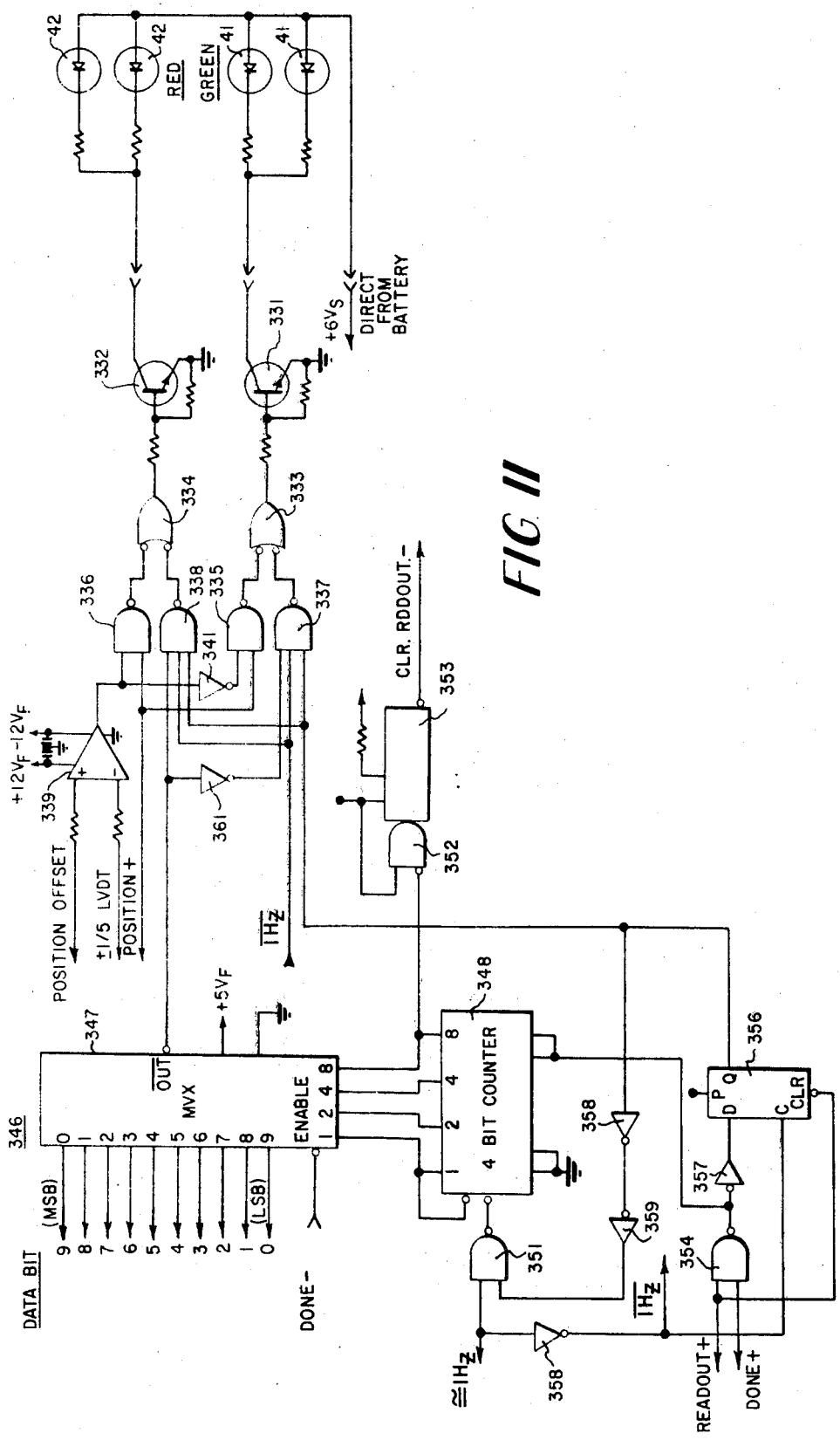
Figure 12:
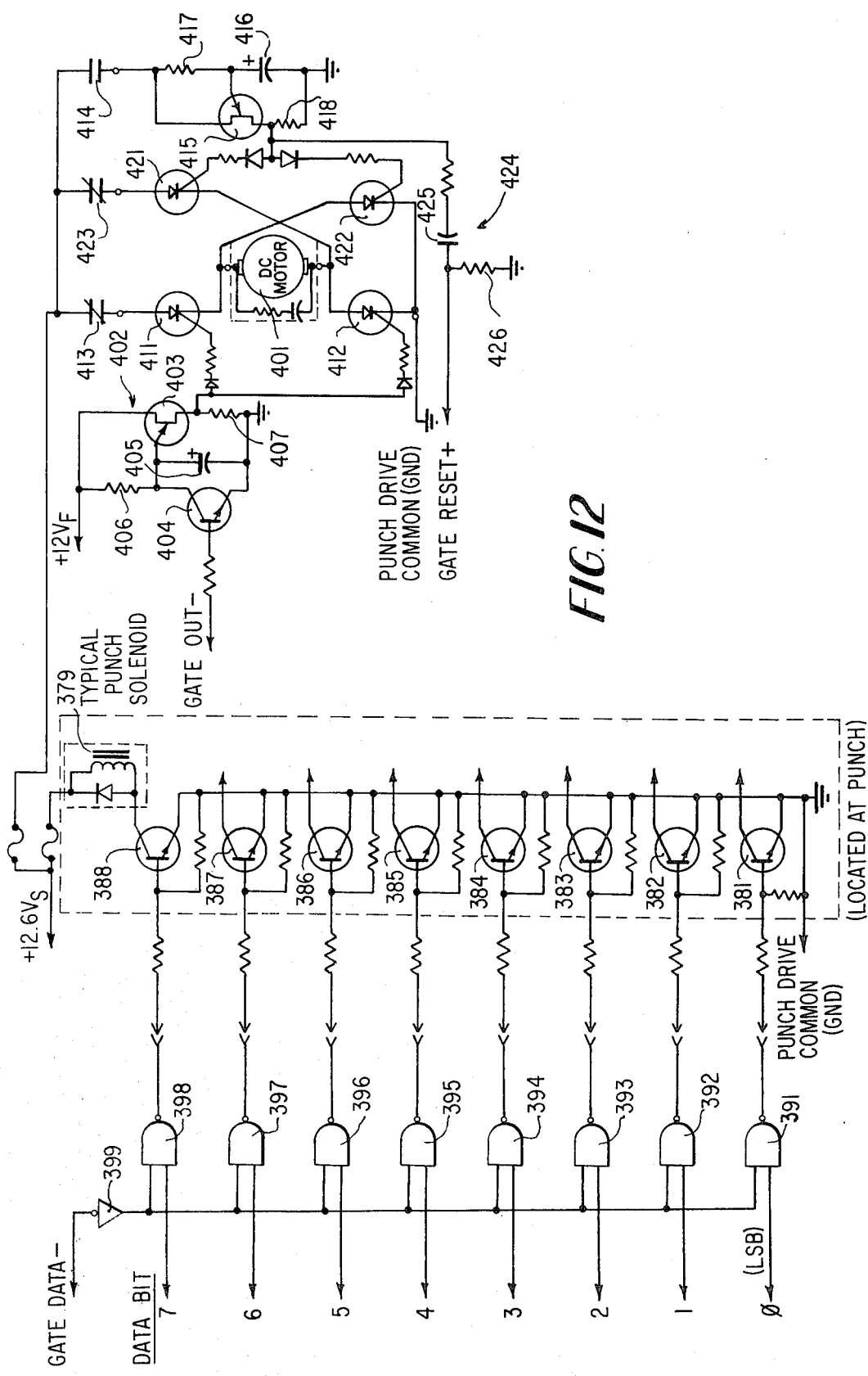

Details of the complete circuit functionally illustrated by FIG. 4 are found in FIGS. 6–12. To assist in a description of the operation of the circuits of FIGS. 6–12, reference may be made to the flow diagram of FIG. 5. In FIGS. 6–12, all integrated circuits are represented either as rectangles, (indicative of flip-flops, multiplexers, or frequency dividers), gates (represented in the usual manner) or amplifiers (represented in the usual manner). All integrated circuits are of the COS/MOS type, except the circuit illustrated in FIG. 10 which is the TTL type. The integrated circuits of FIGS. 6–8 are responsive to a 6 volt D.C. quiescent supply ($6V_Q$), unless otherwise indicated; the integrated circuits of FIGS. 10–12 are responsive to a five D.C. volt supply ($5V_F$) which is derived when the instrument is switched to full power. Discrete circuit elements are illustrated as such in FIGS. 6–12. Certain of these discrete elements are activated while the instrument is in a standby state, as indicated by the nomenclature $6V_S$. True and not true signal states are respectively indicated on the circuit diagrams by (+) and (−) in association with signal representations. A binary one level is represented by a positive pulse or D.C. level, while a binary zero level is represented by a zero voltage.

In FIG. 6, redundant photodetectors 43 are schematically illustrated as phototransistors 43 having the collector electrodes thereof connected to the standby D.C. power source, $+6V_S$. The emitters of transistors 43 are D.C. coupled via isolating diodes 101 to the base of emitter follower transistor 102, having an emitter circuit connected to low pass filter 103. The output voltage of low pass filter 103 is coupled through diode 104 to the base of common emitter transistor 105, having its collector D.C. coupled to the base of common emitter transistor 106. The current developed at the collector of transistor 106 is supplied to a timing circuit including unijunction transistor 107, having its emitter connected to the junction of resistor 108 and capacitor 109, which junction is also connected in D.C. circuit to the collector of transistor 106. The values of resistor 108 and capacitor 109 relative to the firing voltage of unijunction transistor 107 are such that the valley current for the unijunction is not exceeded even when the transistor 107 is activated into a conducting state in response to the voltage developed across capacitor 109. In response to phototransistors 43 being illuminated for at least twenty-five seconds, the voltage across capacitor 109 exceeds the breakdown voltage of unijunction 107, causing the unijunction to be activated into a conducting state and develop a positive pulse across resistor 111 that is connected between the B1 base electrode 112 of unijunction 107 and ground. Since the valley current of unijunction 107 is not exceeded, capacitor 109 remains charged to a relatively high voltage after the unijunction has been fired, whereby in response to a second illumination of phototransistors 43 for an interval of only 15 seconds, or an initial activation of the phototransistors for 40 seconds, unijunction 107 is again activated to derive a pulse across resistor 111.

The pulses developed across resistor 111 are coupled through rectifier 113 to a latching network including NPN and PNP transistors 114 and 115. At the collector of transistor 115 there is provided a filtering network including a series connected diode 116, resistor 117 and capacitor 118 which is charged to a positive D.C. voltage in response to transistor 115 being activated into a conducting state when a pulse is derived across resistor 111. A positive feedback path is provided between the junction of resistor 117 and capacitor 118 to the base of transistor 114, whereby transistors 114 and 115 remain in a conducting state after a pulse is no longer being developed across resistor 111. By virtue of the positive feedback path between capacitor 118 and the base of tansistor 114, a positive D.C. voltage is developed at the collector of transistor 115; this voltage is maintained unless the emitter of transistor 115 is disconnected from its D.C. power supply source, $+6V_S$, for at least 20 seconds. The voltage developed at the collector of transistor 115 is the quiescent voltage, +6$V_Q$, that activates the integrated circuits included in FIGS. 6–8, unless otherwise indicated.

The pulse developed across transistor 111, in addition to activating the latch including transistors 114 and 115, is coupled to circuitry described infra, as a starting pulse for automatically activating the instrument into an auto mode wherein the punch paper tape recorder is automatically periodically energized.

Once the quiescent voltage has been developed at the collector of transistor 115, the voltage level coupled through diode 104 is coupled to the collector of transistor 121, since the collector of this transistor is responsive to the voltage at the collector of transistor 115. The voltage level at the collector of transistor 121 is inverted by NAND gate 122. The complementary input and output of NAND gate 122 are supplied to D input terminals of C-D flip-flops 123 and 124 that assist in detecting whether phototransistors 43 are illuminated for less than or more than 0.7 second. In response to photodetectors 43 being illunimated for less than 0.7 second, to indicate that a visual readout of the position of LVDT 21 is desired, flip-flop 123 is activated to the set state, whereby a binary zero level is derived from complementary ($\overline{Q}$) output terminal of the flip-flop; this level is inverted by driver amplifier 125 that derives a binary signal with the nomenclature READOUT +.

In response to photodetectors 43 being illuminated for more than 0.7 second or in response to the photodetectors not having been previously illuminated, flip-flop 124 is activated to the set state so that a binary zero level is derived at its $\overline{Q}$ output terminal. The $\overline{Q}$ output of flip-flop 124 (POSITION −) is coupled through inverter 126, which derives a binary one level (POSITION +) to indicate that is desired to monitor the position of LVDT 21 for calibration purposes.

The state of flip-flops 123 and 124, once phototransistors 43 have been activated, is complementary until the operation commanded by illumination of the phototransistors has been completed. Initially, both flip-flops 123 and 124 are in the reset state, whereby binary one levels are derived from the $\overline{Q}$ outputs of both of the flip-flops. Flip-flops 123 and 124 are responsive to the output signals of phototransistors 43 only if the instrument is not already in a power up state, as occurs while the recorder is responsive to the LVDT signal. Thereby, is the recorder is activated while a manual input is being commanded, the manual command is ignored. Also, if full power is being turned off, flip-flops 123 and 124 are not responsive to signals from phototransistors 43. Thereby, if a transient occurs at the time full power is being turned off, as is likely, the transient cannot cause false triggering of flip-flops 123 and 124.

To these ends, flip-flops 123 and 124 include C input terminals responsive to a one shot 127 that is driven by NAND gate 128, which is in turn responsive to the voltage developed at the collector of transistor 121. Signals derived at the collector of transistor 121 in response to illumination of phototransistors 43 are normally passed through NAND gate 128. However, in response to the instrument being in a full power condition, or during power reset, the signal from the collector of transistor 121 is prevented from being coupled through NAND gate 128; this result is achieved by coupling binary signals PWR UP + and PWR RST + to the NAND gate from circuitry included in FIGS. 7 and 8, as described infra.

The output signal of NAND gate 128 is coupled to one input of NOR gate 129 that is included in one shot 127. The output of NOR gate 129 is coupled to a timing circuit including capacitor 131 that is connected to biased resistor 132. The junction between capacitor 131 and resistor 132 is connected in D.C. circuit with the input of inverter 133, having an output which is coupled back to an input of NOR gate 129. The value of capacitor 131, resistor 132, and the bias voltage connected to resistor 132 are such that a pulse (MANUAL +) having a duration of 0.7 second is derived at the output of inverter 133 in response to a signal being coupled through NAND gate 128.

The output pulse of one shot 127 is inverted by NAND gate 134, the output of which is coupled in parallel to the C input terminals of flip-flops 123 and 124. Upon the completion of a readout of the position of LVDT 21 in response to a legitimate manual interrogation of the LVDT position by activating phototransistors 43, a binary one signal is derived by circuitry included in FIG. 8 as described infra. The binary one signal is coupled to reset input terminals of flip-flops 123 and 124, whereby both of these flip-flops are activated back to the reset state and binary one levels are simultaneously derived from the $\overline{Q}$ output terminals of both flip-flops.

Reference is now made to FIG. 7 of the drawing wherein there is illustrated a detailed schematic diagram of the clock, power reset and auto start circuits of the electronic equipment. The clock circuitry controls automatic periodic activation of the punch paper tape recorder and other periodically occurring functions; the clock circuitry is activated while the instrument is rendered into a quiescent state. The clock circuitry includes a 16.8kHz oscillator 141 including inverters 142 and 143, having D.C. supply terminals connected to the +6$V_Q$ power supply terminal of FIG. 6. The output of amplifier 143 is coupled back to the input of amplifier 142 via series connected capacitor 144 and resistor 145. A junction between capacitor 144 and resistor 145 is connected to a junction between the output of amplifier 142 and the input of amplifier 143 via frequency determining, variable resistor 146 and fixed resistor 147. At the output terminal of amplifier 143 there is derived a periodic 16.8kHz wave that is inverted by amplifier 148 which derives a 16.8kHz square wave. Amplifier 148 is part of an integrated circuit having two D.C. power supply input terminals, one of which is responsive to +6$V_Q$ and the other of which is responsive to +5$V_F$. In response to the instrument being either in a quiescent or full power state, the amplifiers included in integrated circuit 149 are activated to pass the input signals to them to the outputs thereof.

The output of oscillator 141 is coupled to a clock input terminal of integrated circuit frequency divider 151. The frequency dividing factor of frequency divider 151 is selected whereby the frequency divider derives a square wave having a frequency of approximately 1 Hertz. The 1 Hertz output of frequency divider 151 is inverted by amplifier 152 included in integrated circuit 149.

The approximately 1 Hertz output of frequency divider 151 is supplied to a clock input terminal of a second integrated circuit frequency divider 153. Frequency divider 153 includes five output leads 154–158 on which are respectively derived periodic waves having frequencies of approximately 2 seconds, 16 seconds, 1,000 seconds, 2,000 seconds and 4,000 seconds. One of leads 156–158 is pre-wired to an input terminal of NAND gate 159 to select the automatic activation rate of the punch paper tape recorder. Frequency divider 153 includes a reset input connected to lead 160, which is connected to be responsive to the AUTO STRT + output terminal of FIG. 1. Thereby, frequency divider 153 is reset to zero each time that a pulse is developed across resistor 111 in response to a 25 or 15 second illumination of phototransistors 43.

The 16 second signal developed on lead 155 is inverted by amplifier 161 that is included on integrated circuit 149.

The periodic wave coupled by frequency divider 153 to the input of NAND gate 159 is coupled to the NAND gate output only after the second AUTO STRT + pulse is derived across resistor 111, FIG. 1, at which time the system is in an auto mode. Thereby, if it is not desired to start the punch paper tape recorder immediately upon installation of the instrument, the operator initially illuminates phototransistors 43 for only 25 seconds, and does not thereafter illuminate the phototransistors for an additional 15 or more seconds. When phototransistors 43 are illuminated for an additional fifteen seconds, the instrument is activated into the auto mode. These results are achieved by providing circuit 162 that includes C-D flip-flop 163 having a C input terminal connected to be driven by the AUTO RSTS + signal derived in FIG. 6. Flip-flop 163 includes a D input terminal responsive to the voltage developed at the collector of NPN transistor 164 that is powered by the quiescent voltage, $+6V_Q$. The leading edge of the $+6V_Q$ voltage triggers transistor 164 into a conducting state by being coupled to the base of the transistor through a differentiating network including capacitor 165 and resistor 166. The collector of transistor 164 is thereby normally maintained at a relatively high level, but is pulsed to a low voltage in response to the leading, positive going edge of the $+6V_Q$ voltage. The resulting pulse (PWR RST –) at the collector of transistor 164 is supplied to the D input terminal of flip-flop 163. Flip-flop 163 includes a reset terminal that is responsive to an inverted replica (PWR RST +) of the output of transistor 164, as derived from NOR gate 167, whereby the flip-flop is driven to a reset state in response to the instrument going from a standby state into a quiescent state. The PWR RST + signal is also coupled to the input of NAND gate 128 (FIG. 6) to inhibit activation of one shot 127 when the system is being triggered into a quiescent state. With flip-flop 163 being reset, the second AUTO STRT + signal supplied to the C input of flip-flop 163 activates the flip-flop to a set state and a binary one level is derived from the principle (Q) output terminal of the flip-flop.

The binary one output of flip-flop 163 is coupled to a latch network including cascaded NOR gates 168 and 169. The output of NOR gate 169 is coupled back to an input terminal of NOR gate 168 via oppositely poled series diodes 171 and 172, between which is connected a shunt circuit to ground including parallel resistor 173 and capacitor 174. The cathode of diode 172 and one input terminal or NOR gate 168 are connected to the D.C. standby bias voltage $+6V_S$. The latch circuit including gates 168 and 169 is provided so that in response to a momentary power loss there is not change in the state of the output of NOR gates 168 and 169. The binary signals derived from NOR gates 168 and 169 have the nomenclature AUTO – and AUTO +, whereby binary one levels at the outputs of NOR gates 168 and 169 respectively indicate that the system is not and is operating in the auto mode.

The AUTO + outut of NOR gate 169 is coupled to an input of NAND gate 159, whereby the NAND gate passes the periodic signal coupled to it by the output of frequency divider 153 while a binary one level is derived from NOR gate 169. The signal coupled through NAND gate 159 is inverted by amplifier 175, which derives a TRIGGER + pulse output.

Reference is now made to FIG. 8 of the drawing wherein there is illustrated a schematic diagram of timing logic utilized for controlling the circuits illustrated in FIGS. 6, 7 and 9–12.

In response to the leading edge of the TRIGGER + output of inverter 175, FIG. 7, a number of signals are generated in the circuit of FIG. 8 to indicate that certain commands are to be executed for activating the punch paper tape recorder. A 0.3 second pulse is derived by one shot 181 in response to the output signal of inverter 175. One shot 171 includes a NOR gate 182 having an input connected to the output of inverter 175 and an output which is connected to capacitor 183 that is biased by a D.C. power supply connected to resistor 184. The junction between resistor 184 and capacitor 183 is connected to inverter 185, the output of which is connected to the input of NOR gate 182 to form a feedback circuit.

Th output signal of one shot 181 and the MANUAL + output pulse of one shot 127, FIG. 6, indicative of a manual command being supplied to and accepted by phototransistors 43, are coupled through NOR gate 186 that drives one shot 187. One shot 187 includes capacitor 188 which is biased by a D.C. voltage via resistor 189, having values selected so that one shot 187 derives a pulse having a duration of 0.2 seconds.

The output signal of one shot 187 is applied as a set input to latching flip-flop 193 including cross coupled NOR gates 194 and 195. The reset input of flip-flop 193 is responsive to a binary one level, PWR RST +, derived from NOR gate 167, FIG. 7. Flip-flop 193 is also reset in response to the output of NAND gate 196, having one input responsive to the output of one shot 187 and a second input indicating that a legitimate manually commanded readout for the position of LVDT 21 has been completed. The second input of NAND gate 196 is derived from NAND gate 197, the input of which is derived in a manner desribed infra. A binary one output (PWR UP +) of latching flip-flop 193, at the output terminal of NOR gate 195, is a control signal for activating the instrument into a full power condition. The PWR UP + signal is derived from the emitter of driver transistor 196, the base of which is coupled to the output of NOR gate 195, and the col.__-tor and emitter of which are biased by the quiescent voltage power supply, $+6V_Q$. A PWR UP – signal, which causes the instrument to be driven into a power down, i.e., quiescent state, is derived by feeding the output of NOR gate 195 to an inverter comprising NOR gate 196.

The PWR UP + and PWR UP – signals respectively indicate whether or not the instrument is in a full power or not in a full power condition. If the instrument is in a full power condition, any external manual commands received by phototransistors 43 are ignored by virtue of the connection from the emitter of transistor 196 to the input of NAND gate 128, FIG. 6.

If the system is not in a power up state, but is in the quiescent mode, as indicated by a positive voltage at the collector of transistor 115, FIG. 6, a determination is made as to duration of light impinging on phototransistors 43. To this end, the output of inverter 125 is coupled to one input of one shot 201 including NOR gate 202, having a second input responsive to the output of one shot 181. In response to an output pulse of one shot 181 or the leading edge of a binary one READ OUT + signal, one shot 201 derives a pulse having a ten millisecond duration. To this end, one shot 201 includes capacitor 203 which is biased by a positive D.C. voltage coupled to resistor 204. The junction between capacitor 203 and resistor 204 is connected to an input of inverting amplifier 205, the output of which is coupled in a feedback circuit to the input of NOR gate 202.

The 10 millisecond pulse derived by one shot 201 is selectively coupled through inverting amplifier 206 when the instrument is fully powered, a result achieved by connecting the +5V$_F$ voltage to the power supply terminal of inverting amplifier 206. Amplifier 206 derives a binary level (START −) indicative of the system being in a power up condition while phototransistors 43 are illuminated for between 0.1 and 0.7 seconds.

Upon the completion of an analog to digital conversion, which occurs while the instrument is under full power, a GATE OUT + pulse is derived. To this end, upon the completion of an analog to digital conversion operation, a binary DONE + level is derived from the circuit included in the analog to digital converter of FIG. 10, in a manner described infra. The DONE + signal is combined with the trailing edge of the output of one shot 181 and the +5V$_F$ voltage level in NAND gate 211, the output of which drives inverter 212. The output of inverter 212 is coupled to NOR gate 213 of one shot 214, including timing circuitry for deriving a GATE OUT + pulse having a length of 0.6 seconds. The GATE OUT + pulse derived from one shot 214 is inverted by amplifier 215 whch derives a GATE OUT − pulse. The GATE OUT + signal of one shot 214 is applied as a set input to NOR gate 216 of latching flip-flop 217 that also includes NOR gate 218. In response to flip-flop 217 being activated to the set state, a binary one signal is derived at the output of NOR gate 218. The output of gate 218 is reversed in polarity by inverter 219 which derives a GATE DATA − binary level signal indicative of the paper tape of the recorder having been punched or the LED readout of the position of LVDT 21 being completed.

The output of NOR gate 218 is combined in NAND gate 221 with CLR RDDOUT −, as derived from the circuitry of FIG. 11 as described infra. A binary one output of NAND gate 218 indicates that a power down operation should not be performed at the completion of a visual, serial readout of the position of LVDT 21. Such a power down operation should not occur because during the time that the visual LVDT readout was occurring, a TRIGGER + signal was derived from inverter 175, causing automatic activation of the punch paper tape recorder. The signal derived from NAND gate 221 is coupled to NOR gate 222 of one shot 223 that includes timing circuitry for deriving a 6 microsecond pulse in response to a transition coupled to the input of NOR gate 222. The output pulse of one shot 223 is derived from inverter 224 as the MAN CLR + signal that is coupled to the input of inverting NAND gate 197 to cause selective resetting of latching flip-flop 193. The MAN CLR + output signal of one shot 223 is also applied in parallel to the reset input terminals of flip-flops 123 and 124. Thereby, flip-flops 123 and 124 are simultaneously activated to the same, reset state upon the completion of the power up operation, while power down is occurring.

NOR gate 222 of one shot 223 is also responsive to a pulse indicative of the completion of the 96 second calibration mode. To this end, the output of inverter 161, FIG. 7, having a frequency of approximately sixteen seconds, is coupled to a clock input terminal of divide by six frequency divider 115. Divider 225 is reset as full power is supplied to the instrument in response to a manual command having been received by phototransistor 43, as indicated by the TIME OUT + signal from inverter 192 being coupled to reset input terminal 226 of the frequency divider. Frequency divider 225 is activated only when the instrument is under full power, as a result of a connection between the divider power supply input terminal and the +5V$_F$ power supply terminal.

The output of divider 225, having a frequency of approximately 96 seconds, is coupled through NOR gate 227 and inverter 228 to the input of NOR gate 222 of one shot 223, whereby the one shot derives a 6 microsecond pulse in response to completion of the 96 second calibration interval and the PWR UP − signal is derived from NOR gate 197.

NOR gate 227 is also responsive to a signal indicating that the recording operation of the punch paper tape recorder is being completed or that the system is being activated to the quiescent state. To these ends, the PWR RST − signal derived from the collector of transistor 164, FIG. 7, and a GATE RESET + signal, derived from circuitry included in FIG. 12, as described infra, and indicative of the drive motor for the die plate of the recorder being reversed, are coupled to inputs of NOR gate 231; the GATE RESET + input is coupled to NOR gate 231 via inverter 232. The output of NOR gate 231 is applied as a reset input to NOR gate 218 of flip-flop 217, as well as to an input of NOR gate 227. The input to NOR gate 227 from NOR gate 231 causes a pulse to be derived from one shot 223 to cause the PWR UP − signal to be a binary one level.

The other input to NOR gate 227 which causes the instrument to go to a power down state from a power up state is derived from NAND gate 234. Normally, NAND gate 234 derives a binary one pulse within 2 seconds of the completion of an analog to digital conversion operation while flip-flop 217 is in a set state to indicate that a readout of the LVDT 21 position has been completed. Such a result is accomplished by feeding to the inputs of NAND gate 234 the output signals of one shot 181 and NOR gate 218 of flip-flop 217, as well as the complementary ($\bar{Q}$) output of D-C flip-flop 235. Flip-flop 235 includes a C input terminal that is activated approximately once every 2 seconds in response to the output signal on lead 154 of frequency divider 153, FIG. 7. Flip-flop 235 includes a D input terminal that is responsive to the POSITION − signal derived from the Q output of flip-flop 124, FIG. 6, and a binary one level which indicates that the system is in neither the calibrate nor manual LVDT readout mode. The D input terminal of flip-flop 235 is responsive to the output of NAND gate 236, as derived from the $\bar{Q}$ output of flip-flop 124. NAND gate 236 is also responsive to the principle (Q) output of flip-flop 235. The input signals to the D and C input terminals of flip-flop 235 normally cause a change in state of flip-flop 235 every 2 seconds while a POSITION − signal is being derived from the Q output of flip-flop 124. However, if the instrument is not in an auto mode, whereby the LVDT 21 reading is not periodically coupled to the punch paper tape recorder, a change in the state of flip-flop 235 is inhibited by coupling the AUTO − output level of NOR gate 168, FIG. 7, to the reset input of flip-flop 235. Thereby, if a manually commanded calibration operation or a visual readout of the position of the LVDT is occurring while a command signal is received to cause the punch paper tape recorder to be responsive to the LVDT output, no PWR UP − signal is coupled to NAND gate 234 and the PWR UP + state is maintained at the emitter of transistor 196.

Reference is now made to FIG. 9 of the drawing wherein there is illustrated a circuit diagram for the power controller of the present invention. The power controller is responsive to four different battery packs 241-244 which respectively derive D.C. voltages of 6.1 volts, 12.6 volts, 6.3 volts, and 12.2 volts. Batteries 242 and 243 have a common ground connection at their negative electrodes, while the negative electrode of battery 241 is connected to the positive electrode of battery 242. The positive electrode of battery 244 is connected to ground; thereby, at the positive electrodes of batteries 241, 242, and 243 there are respectively derived positive D.C. levels of 18.7 volts, 12.6 volts, 6.3 volts; at the negative electrode of battery 244 there is derived a negative 12.2 volt D.C. level.

Standby voltages, +6V$_S$ and +12.6V$_S$, are respectively derived from the positive electrodes of batteries 243 and 242 at all times. The standby loads connected to batteries 242 and 243 are approximately 1 milliampere each, current not appreciably greater than the shelf drains of the batteries. The currents derived from batteries 241 and 244, as well as an appreciable amount of the current derived from batteries 242 and 243, are normally inhibited, either by providing gates in series with the output electrodes of the batteries, or because the devices connected to the batteries are not operated. Under quiescent conditions, the voltage at the positive electrode of battery 243 is coupled through the emitter collector path of transistor 115, FIG. 6, to the +6V$_Q$ power supply output terminal which supplies an additional 5 milliamperes to the timing circuitry that is activated during a quiescent power condition. During a full power condition, currents of 25 milliamperes, 50 milliamperes, 500 milliamperes and 30 milliamperes are respectively supplied by batteries 241-244 to the remainder of the circuits at D.C. levels of +18V$_F$, +12V$_F$, +5V$_F$ and −12V$_F$.

To these ends, PWR UP + and PWR UP − signals derived by transistor 196 and NOR gate 197, FIG. 8, respectively forward bias bases of NPN and PNP transistors 245 and 246. Forward biasing transistor 245 provides a current path to the bases of PNP transistors 247, 248 and 249, respectively connected to the positive electrodes of batteries 241-243. Thereby, at the collectors of transistors 247, 248 and 249 there are derived D.C. voltage levels of +18V$_F$, +12V$_F$ and +5V$_F$. The +5V$_F$ voltage at the collector of transistor 249 is applied to the emitter of transistor 246 which is connected to ground through three series connected standoff diodes 250 while a PWR UP − signal is applied to the base of transistor 246. The signals coupled to transistor 246 forward bias the base of transistor 251 which is connected to the negative electrode of battery 244. Thereby, the −12V$_F$ voltage is developed at the collector of transistor 251.

The +18V$_F$ voltage developed at the collector of transistor 247, in addition to being applied to certain of the circuitry schematically illustrated by FIGS. 6-8 and 10-12, is applied to an integrated circuit voltage regulating amplifier 252. At the output of amplifier 252 there is derived a regulated D.C. voltage having a value of +13 volts capable of delivering 20 milliamperes to energize one end of excitation coil 25 of LVDT 21. The other end of coil 25 is connected to the −12V$_F$ voltage derived from the collector of transistor 251.

Reference is now made to FIG. 10 of the drawing wherein there is illustrated a schematic drawing of the dual slope analog to the digital converter 62 and associated circuitry. The analog to digital converter is responsive to the output signal of LVDT 21, as developed across differentially wound output windings 26 and 27. One end of winding 26 is connected to a positive input terminal of operational amplifier 261 via buffering resistor 262 that forms a portion of a voltage divider 263. The other end of voltage divider 263 is connected to a grounded terminal at one end of winding 27. Amplifier 261 develops a D.C. output voltage that is a replica of the D.C. differential voltage developed between the opposite ends of windings 26 and 27; the replica is 1/5 the voltage developed between the opposite ends of windings 26 and 27.

The output voltage of amplifier 261 is coupled to a positive input terminal of D.C., differential, operational amplifier 264. The negative input terminal of amplifier 264 is responsive to a reference voltage that is adjusted so that a unipolar output is derived from amplifier 264 to set the total range of the analog to digital converter. The reference voltage supplied to the negative input terminal of amplifier 264 is adjusted so that in response to core 22 being inserted 11/12 of the way into bore 23 a zero output is derived from amplifier 264. The voltage supplied to the negative input terminal of amplifier 264 is derived from the output of operational amplifier 265, having an input voltage that is adjusted at the time the unit is being manufactured to provide the unipolar output of amplifier 264. The input voltage to amplifier 265 is derived from tap 266 of potentiometer 267 that is connected to a regulated D.C. voltage derived from regulator 268, which in turn is responsive to the +18V$_F$ voltage of the power control circuit of FIG. 9. Regulator 268 includes field effect transistor 269, having source drain electrodes connected in series with the +18V$_F$ power supply voltage. The gate and drain electrodes of field effect transistor 269 are short-circuited to each other and connected to ground through diode 270 and Zener diode 271. Thereby, at the drain electrode of transistor 269 a D.C. reference voltage is derived that is applied to a positive input terminal of differential, operational amplifier 272, the output of which is D.C. coupled to the base of NPN transistor 273. The emitter collector path of transistor 273 is connected between the +18V$_F$ source of potentiometer 267, and a feedback path for regulation of the output of regulator 268 is provided between the emitter of transistor 273 and the negative input terminal of amplifier 272.

The output signal of amplifier 264 is combined with a reference current derived from regulator 268 and opposite polarity reference currents in a network that derives a variable frequency triangular wave having a period determined by the amplitude of the output of amplifier 264. The period of the variable frequency wave is measured by feeding clock pulses to a shift register. Broadly, the network for deriving the variable frequency wave includes integrator 277 that is selectively responsive to currents coupled through switching network 278 from amplifier 264, regulator 268, and sources of the opposite polarity reference current. The output of integrator drives comparator 295 that produces a binary signal for directly controlling switching network 278. The binary output signal of comparator 295 also advances four stage counter 279 that derives output signals for controlling switching network 278.

Switching network 278 includes four MOSFET's 281–284 having source electrodes respectively responsive to the output of amplifier 264, the output of regulator 268 as coupled through variable current adjusting resistor 280, the $-12V_F$ source, and the $+12V_F$ source.

With the system of a full power state, the output signal of differential amplifier 264 is combined at the negative input terminal of operational amplifier 275 with a predetermined current coupled through variable resistor 280 from the output of regulator 268, a positive or negative current from the opposite polarity $-12V_F$ and $+12V_F$ bias voltage sources. Capacitor 276 is connected in a negative feedback path of amplifier 275 to form integrator 277. The four input voltages to the negative input terminal of amplifier 275 are selectively coupled through four MOSFET gates 281–284, each of which includes a substrate terminal that is biased by the $+12V_F$ voltage. The source electrodes of MOSFET's 281–284 are respectively connected to be responsive to the output of amplifier 264, the regulated output of regulator 268, the $-12V_F$ voltage source and the $+12V_F$ voltage source. The drain electrodes of MOSFET's 281–284 are connected together and to a negative input terminal of amplifier 275 of integrator 277. Only in the full power state are MOSFET's 281–284 capable of selectively passing the currents supplied to them, a result achieved by connecting the substrates of the MOSFET's to $+12V_F$. The gate electrodes of MOSFET's 281–284 are normally biased by the outputs of inverters 285–288 to cause the MOSFET's to be pinched off. Inverters 285–288 are respectively responsive to the outputs of NAND gates 291–294, each of which is enabled during a conversion operation by connecting one of its inputs to a DONE — signal, generated at the output of the last stage of shift register 279, as described infra. During a first portion of each analog to digital conversion operation, NAND gate 291 is enabled by the output of the second stage of shift register 279, causing activation of MOSFET 281, whereby the output of amplifier 264 is coupled to the input of amplifier 275; thereby, the output voltage of integrator 277 increases linearly at a rate determined by the position of LVDT 21. During a second portion of each analog to digital conversion cycle, the regulated voltage derived from regulator 268 is coupled through MOSFET 282 to the input of amplifier 275, by virtue of NAND gate 292 being responsive to the output of the third stage of shift register 279, as described infra.

To control charging of feedback capacitor 276 of integrating amplifier 275 in opposite directions to provide the dual slope effect, MOSFET's 283 and 284 are activated at mutually exclusive times, determined by the amplitude of output voltage of integrator 277. In particular, the output of amplifier 275 is coupled to a positive input terminal of comparison amplifier 295, having a negative input terminal connected to ground.

In response to the output of integrator 277 being respectively above and below ground, the output of amplifier 295 is a binary zero and a binary one level. The output of amplifier 295 is directly coupled to one input of NAND gate 296, and is coupled in inverted form to the input of NAND gate 297 via inverter 298. When full power is turned on, the $+5V_F$ signal coupled through resistor 299 provides proper clamping of the output from comparator 295 which is connected to the input of the inverter 298. NAND gates 296 and 297 are enabled prior to the conversion operation by being connected to an output of the first stage of shift register 279 so that the outputs of amplifiers 295 and 298 can be coupled through the NAND gates to permit discharging of integrating capacitor 276. Thereby, prior to the conversion cycle the outputs of NAND gates 296 and 297 are complementary; these complementary outputs are applied to the inputs of NAND gates 293 and 294 to control conduction and pinch-off of MOSFET's 283 and 284 which are responsive to opposite polarity, close to zero, D.C. voltages for controlling the ramp direction of the analog to digital converter.

Shift register 279 for controlling switching network 278, as well as gates 296 and 297, includes four cascaded J-K flip-flops 301–304. The J and K input terminals of flip-flops 303 and 304 are respectively connected to the principle (Q) and complementary ($\overline{Q}$) output terminals of flip-flops 302 and 303; the J and K input terminals of flip-flop 302 are respectively connected to the Q and $\overline{Q}$ output terminals of flip-flop 301; the K and J input terminals of flip-flop 301 are respectively connected to ground and a fraction of the $+5V_F$ voltage, as derived from voltage divider 312. Each of flip-flops 301–304 is activated to a clear state at the beginning of an analog to digital conversion operation, a result achieved by coupling the START — output of amplifier 206, FIG. 8, through cascaded inverters 305 and 306 to the clear (C) input terminals of flip-flops 301–304.

Each of flip-flops 301–304 includes a trigger input terminal that is driven in parallel by the output of NOR gate 307. An output pulse is derived from NOR gate 307 each time a transition occurs at the output of inverter 298 while flip-flop 303 is in a set state. To this end, the output of flip-flop 303 is coupled to one input of NAND gate 308, having a second input responsive to the output of inverting amplifier 298. The output of NAND gate 308 is coupled to a differentiator 309 including capacitor 310 and biased resistor 311 which is connected to voltage divider 312. Pulses derived from differentiator 309 are selectively gated through NAND gate 314 while the system is in an auto mode or in a visual readout mode, in response to the START — output of amplifier 206 being applied to NAND gate 314. The output of NAND gate 314 is applied to 5 microsecond one shot 315 through gate 316 while the system is in a full power state; coupling of the output of gate 314 through gate 316 while the system is in a full power state is attained by connecting one input of gate 316 to the output voltage of voltage divider 312. One shot 315 is also powered by the output of voltage divider 312, and thereby activated only while the system is in a full power state. The output pulse of one shot 315 is inverted by amplifier 317 and coupled to the trigger inputs of flip-flops 301–304 via NOR gate 307.

While flip-flop 302 is in the set state, NOR gate 307 is responsive to a signal indicating that the analog to digital conversion has been completed, as signalled by a binary one being derived from the most significant output bit of the converter. To this end, the most significant output bit of the converter, derived in a manner described infra, is combined with the Q output of flip-flop 302 in NAND gate 318, the output of which is coupled to one input of NOR gate 307.

At the Q and Q̄ outputs of flip-flop 304 there are derived binary signals respectively having the nomenclature DONE + and DONE −. In response to a transition from the DONE − to the DONE + state, an indication is derived that the analog to digital conversion operation has been completed. The DONE + and DONE − signals are utilized for control purposes because of the steady nature thereof, in contrast to the transient nature of the output of NAND gate 318 that is coupled through NOR gate 307 to activate flip-flop 304 into the set state.

As is well known with dual slope converters, the periodicity of a triangular wave derived from integrator 277 is indicative of the amplitude of the analog signal supplied to the converter. A measure of this periodicity is derived by determining the interval between a binary one signal being supplied to the J input of flip-flop 304 and flip-flop 304 being set. This interval is monitored by coupling the Q outputs of flip-flops 302 and 303 to gate 319 that is also responsive to the 16.8 kHz reference frequency derived from inverter 148, FIG. 7. The number of pulses coupled through gate 319 in the interval between transitions at the Q outputs of flip-flops 303 and 304 is a measure of the magnitude of the analog signal supplied to the converter.

The pulses passed through gate 319 are applied to a clock input of a ten stage shift register including three four-bit, cascaded binary counters 321–323; the shift register derives a parallel binary signal indicative of the position of LVDT 21. The most significant bit ouputs of counters 321 and 322 are respectively coupled to the clock inputs of counters 322 and 323. The last two stages of counter 323 are not employed, whereby the most significant bit of the parallel signal is derived from the second stage of counter 323 and the least significant bit is derived from the first stage of counter 321. The most significant bit output of counter 323 is coupled to one input of NAND gate 318 to selectively control triggering of flip-flops 301–304. Counters 321–323 are initially reset through inverter 305 that is responsive to the START − output of amplifier 206, FIG. 8. Thereby, a readout is derived from counters 321–323 only in response to a manual or auto readout command with the system in a full power state.

Reference is now made to FIG. 11 of the drawing wherein there is illustrated a schematic diagram of circuitry for driving green and red LED's 41 and 42 in response to different output signals of FIG. 10. LED's 41 and 42 are connected in the collector circuits of PNP transistors 331 and 332, respectively, and are biased by the standby voltage +6V$_S$. Transistors 331 and 332 are selectively responsive to complementary output signals derived from NOR gates 333 and 334, which are activated during the calibration mode and the manual readout mode. In the calibration mode, NOR gates 333 and 334 are responsive to the binary levels derived from NAND gates 335 and 336, while in the manual readout mode, the NOR gates are respectively responsive to the output signals of NAND gates 337 and 338.

During calibrate, NAND gates 335 and 336 are enabled in response to a POSITION + output signal of inverter 126, FIG. 6, which indicates that phototransistors 43 have been illuminated for in excess of 7/10 of a second. With NAND gates 335 and 336 enabled, the output of comparator amplifier 339 is selectively coupled to NOR gates 333 and 334, depending upon the amplitude of the comparator output. Comparator 339 is responsive to the LVDT indicating output of amplifier 261, FIG. 10, and a reference voltage derived from slider 341 of potentiometer 342, FIG. 10, which is driven by the regulated output of regulator 268. Slider 341 is adjusted so that the input voltages to the positive and negative input terminals of comparator amplifier 339 are equal when core 22 is positioned 11/12 of the way into bore 23. In response to the two inputs to comparator 339 being approximately equal, within 1 millivolt of each other, the output of comparator 339 alternately deviates between positive and negative voltages in response to noise inputs to the comparator. When the unit is properly calibrated, the alternate positive and negative output voltages of comparator 339 cause LED's 41 and 42 to be alternately activated. In response to core 22 being in bore 23 by more than 11/12 of the way, a positive output is derived from comparator 339 and causes activation of transistors 332 and lighting of red LED's 42. In response to the opposite condition, a negative output is derived from amplifier 339; the negative output is inverted by amplifier 341, the output of which drives one input of NAND gate 335. Thereby, transistor 331 is activated and green LED's 41 are energized in response to core 22 being less than 11/12 of the way into bore 23.

Serial readout to the operator by LED's 41 and 42 of the ten-bit binary signal derived from converter 62 is provided by coupling the parallel, binary signal derived from the output leads of counters 321–323 to the input of a parallel to serial converter 346. Parallel to serial converter 246 includes a 16-bit multiplexer 347 having select address controller input terminals responsive to the four outputs of four-bit decade counter 348. Multiplexer 347 includes ten input terminals for the ten parallel data bits derived from binary counters 321–323. In response to a negative transition from the Q̄ output of flip-flop 304 being coupled to the enable input (EN) of multiplexer 347, the signals derived from counters 321–323 are coupled to the input of multiplexer 347 when the analog to digital conversion operation has been completed. Multiplexer 347 stores the ten bits coupled to it and these stored bits are read out under the control of the output signals of 4-bit decade counter 348 to provide the parallel to serial data bit conversion. The data bits are read out, most significant bit first and least significant bit last, at a frequency of one per second, whereby green LED's 41 are activated for ½ second each time a binary one is read out from multiplexer 347 and red LED's 42 are activated for a half second each time a binary zero is read out from multiplexer 247. Between activation of the green and red LED's there is a half second pause.

To these ends, four-bit decade counter 348 is responsive to the approximately 1 Hertz output of amplifier 152, FIG. 7, as coupled to the clock input of the decade counter via NAND gate 351. Decade counter 348 is wired so that in response to the eleventh pulse of any particular sequence applied to its clock input, a binary one to zero transition is derived from the 8 output terminal of the decade counter. Thereby, a binary one to zero transition is derived from the 8 output terminal of decade counter 348 when the parallel to serial conversion operation has been completed by multiplexer 347. The output of the 8 output terminal of counter 348 is coupled through NAND gate 352 to the input of 250 nanosecond one shot 353 while the instrument is at full power, a result achieved by connecting the voltage at the tap of voltage divider 312, FIG. 10, to one input of NAND gate 352. The pulse derived at the output of one shot 353 has the designation CLR RDDOUT − to indicate that the manual readout operation has been completed. The CLR RDDOUT − output pulse derived from one shot 353 is applied to NAND gate 17, FIG. 8, to enable the system to go from a power up to a power down condition upon the completion of the manual readout.

When the analog to digital conversion operation performed by the apparatus of FIG. 10 has been completed and a manual readout has been commanded, counter 348 is reset to a zero state prior to the counter being responsive to the 1 Hertz output of NAND gate 351. To this end, the DONE + output signal at the Q output of flip-flop 304, FIG. 10, is combined with the READOUT + output of converter 125, which indicates that phototransistors 43 have been illuminated for less than 0.7 seconds. The DONE + and READOUT + signals are combined in NAND gate 354 which drives the reset input of counter 348 directly.

To enable NAND gate 351 so that it is responsive to the 1 Hertz output of inverter 152, FIG. 7, only after the conversion has been completed and in response to a manual mode having been commanded, the output of NAND gate 354 is applied to the D input of D-C flip-flop 356 via inverter 357. Flip-flop 356 is activated to the clear state immediately after the manual readout mode has ben commanded, by coupling the READOUT + signal of inverter 125 to the clear input terminal of the flip-flop. The C input of flip-flop 356 is responsive to the 1 Hertz output of inverter 152, FIG. 7, as coupled through inverter 358. Thereby, during the first second after the analog to digital conversion has been completed flip-flop 356 is in a set state, as indicated by the Q output of the flip-flop. The set state of flip-flop 356 enables NAND gate 351, by connecting the Q output of flip-flop 356 to the input of NAND gate 351 via cascaded inverting amplifiers 358 and 359.

With flip-flop 356 in a set state, NAND gates 337 and 338 are enabled, by connecting inputs to these NAND gates to the Q output of flip-flop 356. NAND gates 337 and 338 are driven in parallel by a $\overline{\text{1 HERTZ}}$ output of inverter 358 to selectively pass the serial output signal of multiplexer 347, at terminal $\overline{\text{OUT}}$, to LED's 41 and 42 under the control of the $\overline{\text{1 HERTZ}}$ signal and the Q output of flip-flop 356. The signal at the $\overline{\text{OUT}}$ terminal of multiplexer 347 is coupled directly to NAND gate 338, while the complement of the signal at the $\overline{\text{OUT}}$ terminal is derived from inverter 361 which drives NAND gate 337. Thereby, NAND gates 337 and 338, when enabled by the $\overline{\text{1 HERTZ}}$ signal and the principle (Q) output of flip-flop 356, derive complementary output signals that drive green and red LED's 41 and 42 to indicate the magnitude of the ten-bit binary output of analog to digital converter 62.

Reference is now made to FIG. 12 of the drawing wherein there is illustrated a detailed schematic diagram of the drive circuitry for the punch paper tape recorder which is activated while the system is in the auto mode. The punch paper tape recorder includes eight solenoids 379 for the eight least significant bits of the analog to digital converter; for purposes of clarity, the solenoid for only the eighth most significant bit is illustrated, it being understood that similar solenoids are provided for the other seven least significant bits. Each of solenoids 379 is driven by the output of a different one of common emitter drivers 381–388. The bases of transistors 381–388 are respectively responsive to the output signals of NAND gates 391–398, each of which has an input responsive to the GATE DATA − output signal of inverter 219, FIG. 8, as coupled through inverting amplifier 399. In addition, NAND gates 391–398 are responsive to the eight least significant bits of the parallel binary signal indicative of the output of digital to analog converter, as derived from the outputs of binary counters 321 and 322, FIG. 10. In response to a binary one being derived from a particular stage of counters 321 and 322, the solenoid 379 connected to the corresponding transistor driver is activated. One terminal of each of solenoids 379 is connected to the +12.6$V_S$ D.C. power supply voltage. Since transistors 381–388 are normally in a cutoff condition, the standby voltage 12.6$V_S$, is not normally applied to solenoids 379, whereby power is not consumed by the solenoids except when they are activated.

Control of the forward and reverse movement of a die plate included in the punch paper recorder is provided by D.C. motor 401 which is activated under the control of the GATE OUT − signal derived from inverter 215, FIG. 8. The GATE OUT − signal is derived from inverter 215 only after solenoids 379 have been activated by virtue of delay circuitry included in FIG. 12. The GATE OUT − signal is derived after the analog to digital conversion has been completed, as sensed by one shot 214 deriving a pulse in response to the DONE + output signal at the Q output terminal of flip-flop 304, FIG. 10.

Control of D.C. motor 401 in response to the GATE OUT − signal is provided with a trigger circuit 402 including unijunction transistor 403. Under full power conditions, the +12$V_F$ voltage is applied between the bases B1 and B2 of unijunction transistor 403. During the analog to digital conversion operation, the emitter of unijunction transistor 403 is maintained at a relatively low voltage since the emitter collector path of transistor 404, which is connected between the emitter of unijunction 403 and ground, is forward biased. In response to the completion of the digital to analog conversion operation, the emitter collector path of transistor 404 is back-biased and capacitor 405 begins to charge to the +12$V_F$ voltage through resistor 406. After a predetermined length of time, the voltage across capacitor 405 is sufficient to trigger unijunction 403 into a conducting state and a positive voltage is developed across resistor 407, which is connected between the B1 base of unijunction 403 and ground.

The positive voltage developed across resistor 407 is coupled to the gate electrodes of silicon controlled rectifiers (SCR) 411 and 412 which are connected between motor 401. When energized, SCR's 411 and 412 cause motor 401 to be connected between the +12.6$V_S$ voltage and ground. Current flow through SCR's 411 and 412 is controlled, inter alia, by normally closed contacts 413. Contacts 413 are controlled in response to the position of the motor driving the recorder die plate. Contacts 413 remain closed until the die plate has been translated to a position where punching occurs, at which time contacts 413 are open-circuited. Thereby, current is supplied to motor 401 to translate the die plate to cause punching until the punching operation has been performed. When the die plate has reached the punch position, contacts 413 open-circuit, whereby SCR's 411 and 412 stop conducting and current flow through motor 401 is removed.

Shortly after contacts 413 open, contacts 414 are closed whereby current is supplied by the +12.6V$_S$ supply to the B1 and B2 base electrodes of unijunction transistor 415. The emitter of unijunction transistor 415 is connected to be responsive to the voltage developed across capacitor 416 that is charged by the current flowing through closed contacts 414 via charging resistor 417. Thereby, a predetermined length of time after contacts 414 close, the voltage across capacitor 416 reaches a sufficient level to cause unijunction 415 to fire and develop a pulse across resistor 418 that is connected between the B1 base of unijunction transistor 415 and ground.

The voltage developed across resistor 418 is coupled in parallel to the gate electrodes of silicon control rectifiers 421 and 422 which are connected to D.C. motor 401 to supply current to the motor from the +12.6V$_S$ supply in a direction opposite from that when SCR's 411 and 412 are conducting. Current is supplied to SCR's 421 and 422 and D.C. motor 401 via normally closed contacts 423 that are responsive to the position of the die plate. When the die plate is driven by D.C. motor 401 back to its initial, quiescent location, contacts 423 are open-circuited, so that the flow of current through D.C. motor 401 is blocked. Thereby, each time a GATE OUT − signal is derived, motor 401 drives the die plate by the correct amount toward the punched pins and retracts the die plate to its initial position.

To determine when the die plate begins to retract from the punches for the punch paper tape, a GATE RESET + output signal developed across resistor 418 is coupled to a differentiator 424 including capacitor 425 and shunt resistor 426. The pulse developed at the output of differentiator 424 is coupled to latch 217, FIG. 8, via inverter 232 and NOR gate 231. Thereby, latch 217 is reset upon completion of the automatic, periodic readout of LVDT 21 by the punch paper tape recorder.

Reference is now made to FIGS. 13–21 wherein there is illustrated, in varying degrees of particularity, the punch paper tape recorder included in compartment 31. The punch paper tape recorder is specially designed so that it can fit into a tube having a circular cross-section and a diameter on the order of 1⅝ inches. The punch paper tape recorder utilizes, as a binary signal storage means, an endless paper tape 501 of a type that is usually employed for recording eight bit binary signals and is provided with pre-punched sprocket or guide holes 502. The punch paper tape recorder basically includes: a punching station 503 positioned on one side of tape 501, as illustrated in detail in FIG. 14; an actuator station 504 for the punches at punch station 503; a die plate 505 selectively urged against a second side of the paper tape; a drive mechanism 506 for die plate 505; and a drive mechanism 507 for the punch paper tape. Tape 501 is threaded so that is passes through a relatively narrow gap between punch station 503 and a face of die plate 505.

Punch station 503 includes eight punches 511 horizontally disposed across the width of tape 501, except where sprocket holes 502 are located. Punches 511 are normally free to translate in a horizontal plane, but are selectively locked in situ. An end of each locked punch 511 proximate the inner face of tape 501 engages and punches the tape in response to activation of solenoid coils 379, FIG. 12, one of which is provided for controlling the different punches. Eight sets of substantially identical mechanisms are provided for locking the eight punches 511, so that a description of one locking mechanism basically suffices for all. Selective locking of the position of punches 511 is attained by providing anchor levers 513, each having a vertically extending wall that normally bears against a vertically extending face of shoulder 512 at the end of punch 511 remote from the end that selectively engages tape 501. Alternate ones of anchor levers 513 are mounted to be pivoted about rods 514 and 515, which are respectively positioned above and below a horizontal plane containing the longitudinal axis of punches 511. The corner of anchor lever 513 remote from the face of the anchor lever that bears against shoulder 512, and remote from the pivot axis defined by rods 514 and 515, is normally captured in a square notch at the end of latch lever 516. Alternate ones of latch levers 516 are rotatable about rods 517 and 518, respectively horizontally aligned with rods 514 and 515.

The rotation of anchor levers 513 and latch levers 516 about shafts 514, 515, 517, and 518 is controlled by anchor lever tension springs 521, latch lever tension springs 522 and pull wires 523. Each of anchor lever springs 521 is fixedly secured to a corner of its corresponding anchor lever 513, urging the anchor lever toward the right, as illustrated in FIG. 20. Each of latch lever springs 522 is connected to an edge of its respective latch lever 516. Springs 522 extend generally horizontally and lie approximately along the center line of the recorder to urge its latch lever toward the right. Each of pull wires 522 is mounted on its corresponding latch lever 516 between the edges of the latch levers adjacent the center line and the pivot points defined by rods 517 and 518.

Each of pull wires 523 is selectively activated in response to energization of the solenoid 531 connected to it. Eight solenoids 531, each including a solenoid coil 379, and one for each of the eight least significant binary output bits of the converter, are mounted in side-by-side pairs, so that four pairs thereof are disposed along the length of the 1⅝ inch diameter tube. An activated solenoid causes its pull wire 523 to be translated to the left, through bracket 539, that is connected between a plunger 540 of the solenoid and the end of wire 523 remote from the wire end connected to latch lever 516.

In response to energization of a selected solenoid 531 due to activation of a solenoid coil 379, FIG. 12, the plunger 540 of the selected solenoid is translated to the left, drawing the bracket 539, connected to the energized solenoid coil, and the associated pull wire 523 in the same direction. The pull wires 523 which are drawn to the left cause the latch levers 516 mounted for rotation about rod 517 to be rotated in the clockwise direction, while the latch levers mounted for rotation about rod 518 are rotated in a counterclockwise direction. The clockwise and counterclockwise rotations of the latch levers 516 respectively mounted on rods 517 and 518 cause the notches in the latch levers to securely engage the corners of the associated anchor levers 513. Thereby, the anchor levers 513 having corners engaged by the notches in latch levers 516 are restrained from movement; the restraint is maintained during the entire time while the associated solenoids 531 are activated.

The latch levers 516 connected to pull wires that are not pulled to the left (i.e., the pull wires which are ultimately connected to solenoids that are not activated) are free to pivot in the counterclockwise and clockwise directions about pivot rods 517 and 518, respectively. Thereby, the anchor levers 513 associated with the latch levers that are not restrained are also free to pivot; those anchor levers mounted on rod 514 rotate in the clockwise direction in response to a horizontal force being imparted thereto by punches 511 being translated to the left, while the anchor levers mounted to rotate on rods 515 pivot in the counterclockwise direction in response to their associated punches 511 being translated to the left.

In summary, the selective latching of anchor levers 513 and latch levers 516 provides corresponding latching for punches 511. The punches 511 which are coupled to unlatched anchor levers are free to translate to the left in response to a force being exerted against the punch faces adjacent tape 401 by translation of die plate 505 to the left. The latched punches are held in situ while the die plate is translated to the left to urge tape 501 against the latched punches, whereby the leftward movement of the die plate 505 causes punching.

Die plate 505 is translated to the left by drive mechanism 506 after pins 511 have been selectively latched in place. Drive mechanism 506 includes reversible D.C. motor 401, that is positioned at the extreme right end of the recorder, as viewed in FIG. 15, and is energized by the circuitry schematically illustrated in FIG. 12. Motor 401 includes an output shaft 542 that is rotated in the clockwise direction, looking at the motor from the shaft end, while solenoids 531 are energized. Shaft 542 is threaded into push plate 543 that is connected to die plate 505, causing the die plate to translate toward the left. Translation of die plate 505 causes translation of punch station 503 and tape 501 to the left, a result achieved by passing the tape over horizontally translatable idler rolls 568 and 569 and mounting the punch station on horizontally translatable struts. When idler rolls 568 and 569 and punch station 503 advance to the dotted line position illustrated in FIG. 20, die plate 505, which is fixedly mounted on station 503, has advanced slightly farther to a position where punching occurs. The punches 511 that are restrained by latched anchor levers 513 abut against and punch through tape 501; those punches 511 which are not restrained continue to be translated toward the left in response to the movement of die plate 505 against tape 501. The motion of the unrestrained punches 511 is limited by the force exerted by springs 521 against anchor levers 513 that are not associated with activated solenoids.

The rotation of motor shaft 542 in the clockwise direction is limited by a gear train including gear 545 that is pinned to shaft 542, whereby the leftward translation of die plate 505 is correspondingly limited. Gear 545 meshes with gear 546 that is pinned to pinion shaft 547. Pinion shaft 547 drives gear 548 which is free to turn on sleeve bearing 549 that is carried by motor shaft 542. Gear 548 carries a longitudinally extending pin 551 on its face. Pin 551 selectively engages opposite edges of limit switch actuator 552 that is formed as a radially extending tongue on sleeve bearing 549. In response to rotation of shaft 542 a predetermined amount, less than several revolutions, in the counterclockwise direction, pin 551 engages the upper edge of tongue 552, causing the tongue to be rotated in the clockwise direction, to engage limit switch 553.

In response to activation of limit switch 553, which corresponds with switch contacts 413 and 414, FIG. 12, power is removed from motor 401. Thereby motor 401 is de-energized in response to tongue 552 engaging switch 553. Shortly thereafter, a leading edge of the GATE RESET + signal derived from FIG. 12 is applied to the energization circuits for solenoids 531, causing the solenoids to be de-activated. As solenoids 531 are being de-activated, current flows through motor 401 in the opposite direction from that which caused clockwise rotation of shaft 542, whereby shaft 542 is driven in the counterclockwise direction. Counterclockwise rotation of shaft 542 continues until pin 551 engages the lower edge of tongue 552 to drive the tongue in the counterclockwise direction into engagement with limit switch contacts 553 which correspond with contacts 423, FIG. 12. In response to contacts 553 being engaged, contacts 423 are open-circuited to de-energize motor 401 and prevent further rotation of shaft 542 in the counterclockwise direction.

Activation of motor 401 causes advancement of paper tape 401 so that the paper tape advances through the gap between die plate 505 and punching station 503 at the same rate as the leftward movement of the die plate and punching station. Since tape 501 and die plate 505 are advancing at the same rate, the tape is stationary with respect to the die plate during the punching part of the cycle. Advancement of paper tape 501 is provided by coupling the tape drive mechanism 507 to motor 401.

Tape drive mechanism 507 includes an idler bracket 561, the lower end which is fixedly connected to push plate 543 by push rod 562. The upper end of idler bracket 561 is mounted to pivot about pin 563 so that when motor 401 drives push plate 543 to the left, the idler bracket is rotated in a clockwise direction. Clockwise rotation of idler bracket 563 results in paper tape 501 advancing to the left on the lower side of the recorder at the same rate that die head 505 is moving to the left. To this end, idler bracket 563 carries roller 564, over which tape 501 is wound for approximately 180°. Roller 564 is mounted on idler bracket 561 by shaft 565 that is positioned between the upper and lower ends of the idler bracket. Tape 501 is restrained from moving on the upper side of the recorder by ratcheted drive sprocket 566, having teeth which engage the sprocket holes of tape 501, and which is positioned on the upstream side of the gap between punches 511 and plate 505, between idler roll 564 and the gap.

Tape 501 is wound so that it extends from the upper portion of idler roller 564 over sprocket 566 and thence to fixedly mounted idler roller 567. From the upper end of idler roller 567, tape 501 extends to idler roller 586, over which it passes for approximately 90° into the gap between punch station 503 and die head 505. Downstream of punch station 503, tape 501 takes a 90° turn at idler roller 570 and ratcheted drive sprocket 571. From sprocket 571, the tape proceeds to idler 572 and back to the underneath surface of idler 564.

In response to motor 401 rotating in the counterclockwise direction, to translate die plate 505 toward the right, idler bracket 561 is rotated counterclockwise about pin 563. Counterclockwise rotation of idler bracket 561 results in tape 501 being drawn from the upper side of the recorder since the tape is now restrained by ratcheted drive sprocket 571. Thereby, paper tape 501 is advanced through the punch station 503 into the next punch position. Ratcheted drive sprockets 566 and 571 are adjusted such that the motion of push plate 543 causes paper tape 501 to advance exactly 0.100 inch, the standard advancement of a punch paper tape for each punching operation. Thereby, conventional punch paper tape readout mechanism can be utilized to interpret the stored data indicative of the readings of LVDT 21.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Self-contained apparatus for measuring the deflection of a subterranean tunnel under excavation, said apparatus being a sensor-recorder indicating instrument adapted for insertion into a radially extending bore of the tunnel wall adjacent an advanced end of the excavation, said instrument having the component means thereof disposed in a longitudinally apportioned compact arrangement which is completely fitted within a generally uniform rod-like body of said instrument, and comprising said components are,
   means for anchoring a first end of said instrument facing toward the end of said bore remote from the tunnel wall,
   means for anchoring within said bore and adjacent said tunnel wall a second end of said instrument which is opposite said first end, withal said first and said second ends are linearly displaceable relative to each other,
   a transducer means operable within a first portion of said instrument for sensing the linear displacement between said first and said second ends and producing a signal which is a measurement of said displacement,
   a signal storage means operable within a second portion of said instrument in accordance with said measurement signal,
   a means of a third portion of said instrument whereof a face carries thereon a visual readout means which is observable within said bore adjacent said tunnel wall, and whereat said visual readout means is operable in accordance with said measurement signal, and
   means contained in further portions of said instrument for powering said transducer means, said signal storage means, and said visual readout means.

2. The apparatus of claim 1 wherein the signal storage means comprises means for storing a binary signal, and means responsive to the position of the transducer means for deriving a signal indicative of the amount of linear displacement between the first and second ends of the instrument, said storage means being responsive to the binary signal to store the value thereof.

3. The apparatus of claim 2 further including clock means for periodically activating the signal storage means to be responsive to the binary signal.

4. The apparatus of claim 2 wherein the signal storage means includes a punch paper tape recorder.

5. The apparatus of claim 4 wherein the punch paper tape recorder includes a plurality of punches, a die plate, a gap through which the tape passes being formed between the punches and die plate, means for selectively urging said die plate toward the paper tape and the punches, and means for selectively restraining movement of certain of said punches relative to the movement of the paper tape and the die plate while enabling others of said punches to be moved in response to the movement of the die plate, said punches and die plate being activated so that the restrained punches cause holes to be punched into the paper tape in response to movement of the die plate.

6. The apparatus of claim 5 further including means for advancing the tape through the gap at the same rate as the die plate approaches the tape and while the die plate is approaching the tape.

7. The apparatus of claim 6 wherein the means for advancing the tape includes means for enabling the tape downstream of the gap to be advanced while the tape upstream of the gap is being retained during movement of the die plate toward the punches and for restraining movement of the tape downstream of the gap while enabling movement of the tape upstream of the gap as the die plate is moving away from the punches after a punching operation has occurred.

8. The apparatus of claim 7 wherein the means for advancing the tape includes an idler roll mounted on a rotatable bracket connected for rotation away from and toward the gap as the die plate is being advanced toward and retracted from the punches, first ratcheted sprocket means positioned on the downstream side of the tape between the idler roll and the slot, and second ratcheted sprocket means positioned on the upstream side of the tape between the idler roll and the slot, said first and second ratcheted sprocket means respectively being arranged to inhibit movement of the tape as the die plate is moving toward and moving away from the punches.

9. The apparatus of claim 5 wherein the means for restraining movement of selected punches includes for each punch a rotatable anchor lever having a face bearing against a face of the punch remote from the gap, a latch lever for the anchor lever, said latch lever having a notch against which a corner of the anchor lever is positioned, and means for selectively urging the latch lever to be rotated about a pivot point thereof so that the notch thereof captures the corner of the anchor lever to restrain rotation of the anchor lever and movement of the punch.

10. The apparatus of claim 2 wherein the visual readout means includes an optical display responsive to a binary signal responsive to the transducer and indicative of the displacement between the first and second ends of the instrument.

11. The apparatus of claim 10 further including means responsive to the transducer means for deriving a serial binary signal having bit values indicative of the linear displacement between the first and second ends of the instrument, said visual readout means including light sources of two different colors, means for activating the light source of one color in response to binary bits having one value, and means for activating light sources of the other color in response to binary bits having a second value.

12. The apparatus of claim 11 further including means for activating the visual display to be responsive to the serial binary signal in response to a first operator induced external command.

13. The apparatus of claim 12 further including means responsive to a second externally induced operator command for activating the instrument into a calibrate mode, means responsive to the transducer for respectively coupling relatively steady first and second signals to the first and second light sources while the instrument is in the calibrate mode, said first and second relatively steady signals representing different relative positions of the first and second ends on opposite sides of a reference location for the relative position between the first and second ends.

14. The apparatus of claim 13 wherein the means for deriving the first and second relatively steady signals includes means for deriving relatively rapidly varying signals having first and second amplitudes in response to the relative position of the first and second ends being approximately at the zero location, said relatively rapid first and second signals being coupled to the first and second light sources, whereby both of the light sources appear to the operator to be substantially simultaneously activated.

15. The apparatus of claim 13 further including clock means for periodically activating the signal storage means to be responsive to the binary signal, and logic circuitry contained in the instrument for maintaining the storage means in operation once the storage means has been periodically activated even though an externally induced operator command has been applied to the instrument.

16. The apparatus of claim 15 wherein the logic means includes means for activating the storage means to be responsive to the transducer means upon completion of an operator induced external command which is being coupled to the visual readout means while a command signal is being derived for normally causing the storage means to be periodically activated.

17. The apparatus of claim 16 wherein the logic means further includes means for disabling the instrument a periodic time after an externally induced operator command has been supplied to it.

18. The apparatus of claim 13 wherein the means for activataing the instrument in response to externally induced operator commands includes photodetector means responsive to optical energy impinging on said face of the instrument.

19. The apparatus of claim 18 further including means for detecting the length of time the optical energy impinges on the photodetector, and means responsive to the detected length of time for establishing different modes of operation of the instrument.

20. The apparatus of claim 19 wherein the means for establishing different modes includes means responsive to the optical energy persisting for a first time interval causes the instrument to be activated from a standby state to a quiescent state, means responsive to the optical energy impinging on the photodetector for a second time interval for activating the instrument so that the storage means is periodically responsive to the transducer, said first interval being greater than any of the other intervals, means responsive to the optical energy impinging on the instrument for a third interval of time after the instrument has been activated into the quiescent mode for activating the instrument into a calibrate mode, and means responsive to the optical energy impinging on the photodetector for a fourth interval of time for activating the instrument into a visual readout mode after the instrument has been activated into the quiescent mode.

21. The apparatus of claim 10 further including means responsive to an externally induced operator command for activating the instrument into a calibrate mode, means responsive to the transducer for respectively coupling relatively steady first and second signals to the first and second light sources while the instrument is in the calibrate mode, said first and second relatively steady signals representing different relative positions of the first and second ends on opposite sides of a reference location for the relative position between the first and second ends.

22. The apparatus of claim 21 wherein the means for deriving the first and second relatively steady signals includes means for deriving relatively rapidly varying signals having first and second amplitudes in response to the relative position of the first and second ends being approximately at the zero location, said relatively rapid first and second signals being coupled to the first and second light sources, whereby both of the light sources appear to the operator to be substantially simultaneously activated.

23. Apparatus for measuring the amount of deflection of a subterranean tunnel while the tunnel is being dug comprising a rod-like instrument adapted to be inserted into a radially extending bore of the tunnel wall adjacent the end of the tunnel where the tunnel is being dug, means for anchoring one end of the instrument at the end of the bore remote from the tunnel wall, means for anchoring the other end of the instrument adjacent the end of the bore adjacent the tunnel wall, said first and second ends of said instrument being linearly displaceable relative to each other, transducer means mounted on the instrument for measuring the amount of linear displacement between the first and second ends of the instrument, binary visual readout means mounted on a face of the instrument adapted to be located adjacent the tunnel wall, said readout means being responsive to the transducer means to display values indicative of the displacement between the first and second ends of the instrument, photodetector means mounted on the face responsive to optical energy derived from an externally induced operator command, and means responsive to the optical energy impinging on the photodetector for connecting the visual readout means to be responsive to the position indicating signal derived from the transducer means.

24. The apparatus of claim 23 further including means responsive to the transducer means for deriving a serial binary signal having bit values indicative of the linear displacement between the first and second ends of the instrument, said visual readout means including light sources of two different colors, means for activating the light source of one color in response to binary bits having one value, and means for activating light sources of the other color in response to binary bits having a second value.

25. The apparatus of claim 24 further including means for activating the visual display to be responsive to the serial binary signal in response to optical energy of a first duration impinging on the photodetector and means to define a first operator induced external command.

26. The apparatus of claim 25 further including means responsive to optical lenergy of a second duration impinging on the photodetector means to define a second externally induced operator command for activating the instrument into a calibrate mode, means responsive to the transducer for respectively coupling relatively steady first and second signals to the first and second light sources while the instrument is in the calibrate mode, said first and second relatively steady signals representing different relative positions of the first and second ends on opposite sides of a reference location for the relative position between the first and second ends.

27. The apparatus of claim 26 further including signal storage means for storing a binary signal, and means responsive to the position of the transducer means for deriving a signal indicative of the amount of linear displacement between the first and second ends of the instrument, said storage means being responsive to the binary signal to store the value thereof, and clock means for periodically activating the signal storage means to be responsive to the binary signal.

28. The apparatus of claim 27 further including logic circuitry for maintaining the storage means in operation once the storage means has been periodically activated even though an externally induced operator command has been applied to the instrument.

29. The apparatus of claim 28 wherein the logic means includes means for activating the storage means to be responsive to the transducer means upon completion of an operator induced external command which is being coupled to the visual readout means while a command signal is being derived for normally causing the storagemeans to be periodically activated.

30. The apparatus of claim 27 wherein the logic means includes means for activating the storage means to be responsive to the transducer means upon completion of an operator induced external command which is being coupled to the visual readout means while a command signal is being derived for normally causing the storage means to be periodically activated.

31. The apparatus of claim 27 wherein the logic means further includes means for disabling the instrument a periodic time after an externally induced operator command has been supplied to it.

32. The apparatus of claim 27 further including means for detecting the length of time the optical energy impinges on the photodetector, and means responsive to the detected length of time for establishing different modes of operation of the instrument.

33. The apparatus of claim 32 wherein the means for establishing different modes includes responsive to the optical energy persisting for a first time interval causes the instrument to be activated from a standby state to a quiescent state, means responsive to the optical energy impinging on the photodetector for a second time interval for activating the instrument so that the storage means is periodically responsive to the transducer, said first interval being greater than any of the other intervals, means responsive to the optical energy impinging on the instrument for a third interval of time after the instrument has been activated into the quiescent mode for activating the instrument into a calibrate mode, and means responsive to the optical energy impinging on the photodetector for a fourth interval of time for activating the instrument into a visual readout mode after the instrument has been activated into the quiescent mode.

34. The apparatus of claim 23 wherein the means for deriving the first ans second relatively steady signals includes means for deriving relatively rapidly varying signals having first and second amplitudes in response to the relative position of the first and second ends being approximately at the zero location, said relatively rapid first and second signals being coupled to the first and second light sources, whereby both of the light sources appear to the operator to be substantially simultaneously activated.

35. The apparatus of claim 23 further including means responsive to an externally induced operator command for activating the instrument into a calibrate mode, means responsive to the transducer for respectively coupling relatively steady first and second signals to the first and second light sources while the instrument is in the calibrate mode, said first and second relatively steady signals representing different relative positions of the first and second ends on opposite sides of a reference location for the relative position between the first and second ends.

36. The apparatus of claim 35 wherein the means for deriving the first and second relatively steady signals includes means for deriving relatively rapidly varying signals having first and second amplitudes in response to the relative position of the first and second ends being approximately at the zero loation, said relatively rapid first and second signals being coupled to the first and second light sources, whereby both ofthe light sources appear to the operator to be substantially simultaneously activated.

* * * * *